(12) United States Patent
Kowald et al.

(10) Patent No.: US 11,612,097 B2
(45) Date of Patent: Mar. 28, 2023

(54) METHOD, SYSTEM AND APPARATUS FOR MANAGING CROPS

(71) Applicant: CANON KABUSHIKI KAISHA, Tokyo (JP)

(72) Inventors: Julie Rae Kowald, New South Wales (AU); Dixon De Sheng Deng, New South Wales (AU); Nicholas Grant Fulton, New South Wales (AU); Oscar Alejandro De Lellis, New South Wales (AU)

(73) Assignee: Canon Kabushiki Kaisha, Tokyo (JP)

( * ) Notice: Subject to any disclaimer, the term of this patent is extended or adjusted under 35 U.S.C. 154(b) by 406 days.

(21) Appl. No.: 16/709,767

(22) Filed: Dec. 10, 2019

(65) Prior Publication Data

US 2020/0196516 A1 Jun. 25, 2020

(30) Foreign Application Priority Data

Dec. 19, 2018 (AU) .............................. 2018282338

(51) Int. Cl.
*A01B 79/00* (2006.01)
*A01C 21/00* (2006.01)
*G06Q 50/02* (2012.01)

(52) U.S. Cl.
CPC .......... *A01B 79/005* (2013.01); *A01C 21/005* (2013.01); *A01C 21/007* (2013.01); *G06Q 50/02* (2013.01)

(58) Field of Classification Search
CPC ..... A01B 79/005; A01B 79/00; A01C 21/005; A01C 21/007; A01C 21/00; G06Q 50/02; G06Q 50/00
See application file for complete search history.

(56) References Cited

U.S. PATENT DOCUMENTS

| | | |
|---|---|---|
| 7,363,584 B1 | 4/2008 | Molesky |
| 7,370,244 B2 | 5/2008 | Breitling et al. |
| 9,817,563 B1 | 11/2017 | Stokes et al. |
| 2014/0263709 A1 | 9/2014 | Kocer et al. |
| 2016/0166464 A1 | 6/2016 | Douglas et al. |
| 2017/0030877 A1 | 2/2017 | Miresmailli et al. |
| 2017/0139380 A1 | 5/2017 | Englard et al. |
| 2018/0082204 A1 | 3/2018 | Iwamasa et al. |
| 2018/0271029 A1 | 9/2018 | Hatamian |

*Primary Examiner* — Christopher J. Novosad
(74) *Attorney, Agent, or Firm* — Canon U.S.A., Inc. IP Division

(57) ABSTRACT

A method of managing crops using an electronic device having an interface. Inputs of crop data is received, and each of the crop data is associated with a sample site location corresponding to each of a plurality of images captured by an image capturing device. A graph plotting one or more types of crop data including data associated with the plurality of images is generated in a first display region of the interface. A subset of sample site locations requiring one of a predetermined set of actions is displayed on the map in a second display region of the interface based on a selection within one of the plots on the graph.

14 Claims, 20 Drawing Sheets

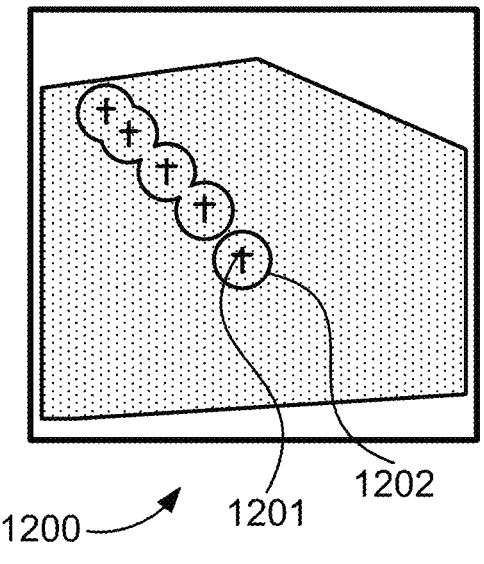
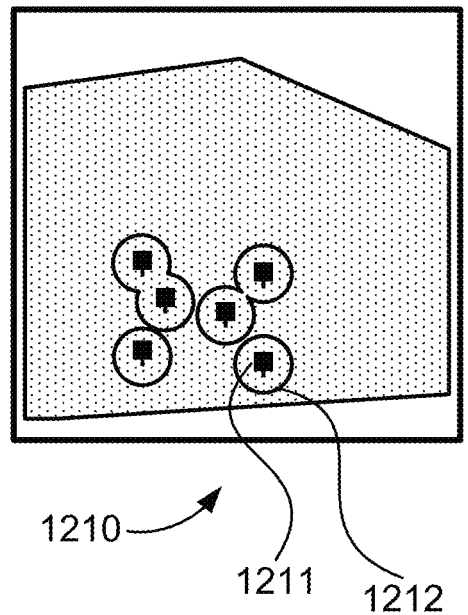
Fig. 12A     Fig. 12B
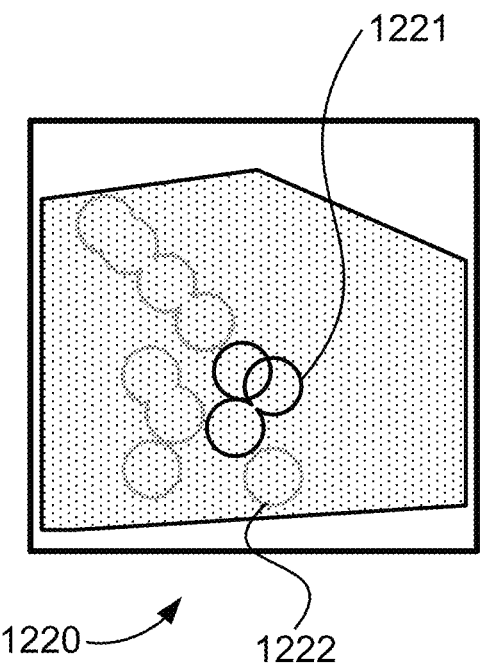
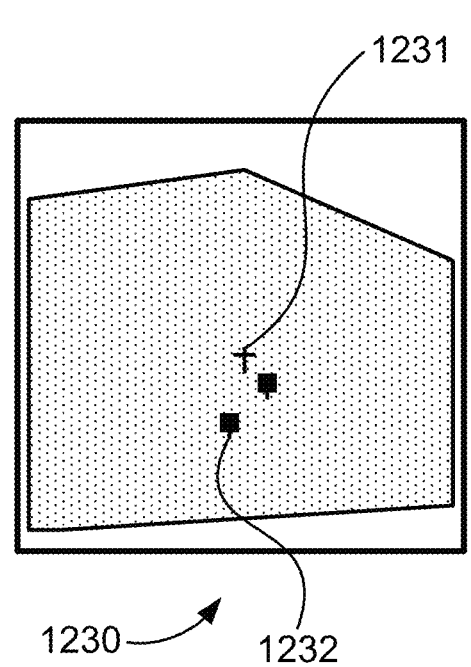
Fig. 12C     Fig. 12D

METHOD, SYSTEM AND APPARATUS FOR MANAGING CROPS

REFERENCE TO RELATED APPLICATION

This application claims the benefit under 35 U.S.C. § 119 of the filing date of Australian Patent Application No. 2018282338, filed 19 Dec. 2018, hereby incorporated by reference in its entirety as if fully set forth herein.

TECHNICAL FIELD

The present invention relates generally to crop management and, in particular, to managing crops using an electronic device having an interface. The present invention also relates to a method and apparatus for managing crops, and to a computer program product including a computer readable medium having recorded thereon a computer program for managing crops using an electronic device having an interface.

BACKGROUND

Employees and contractors of a farm normally use sampling techniques to survey the farm by recording crop data at multiple locations across the farm. The crop data is then analysed using a spreadsheet or similar program suitable for graphing and analysis. A result of the analysis is typically several crop health-plots representing health of the crop. The crop health-plots are used by farm managers and the purchasers of their produce to view and understand the yields and quality that the farm is currently producing, that the farm may produce by the end of a growing season, and that the farm has produced on previous growing seasons.

Once crop data has been plotted in a health-plot for analysis, conventional methods are limited in the ways that the crop data can be represented. Typically, once the crop data is in a graph, the data remains in a graph with optionally a tabular form representing the crop data. Some conventional methods allow a user to drill-in to the graph data to view different aspects of the data or list all the properties of the graph data. Other existing methods allow the user to view one graph and then as a result of a user-operation to show a different graph to help in the understanding of the data.

However, the existing methods do not utilise the location where the samples were recorded in order to assist the farm managers and their customers to understand the collected crop data.

SUMMARY

It is an object of the present invention to substantially overcome, or at least ameliorate, one or more disadvantages of existing arrangements.

Disclosed are arrangements for displaying crop data collected across a farm, or farms, or a part there-of (e.g., a block of land). The disclosed arrangements take advantage of knowledge of where each sample in each survey was recorded, the time the sample was recorded and the value that was recorded relative to other samples.

In one aspect of the present disclosure, a user is presented with a user interface that consists of three parts. A first part of the user interface comprises a scrollable area of health-plots; a second part comprises a map of sample locations, and a third part comprises a list of actions.

Each sample at a location may contain one or more crop data values stored with the sample. The samples may be recorded manually or with the aid of a sensor or by a sensor itself. Sensor types include, imaging devices (e.g., red, green, blue (RGB) cameras, infra-red (IR), cameras, normalised difference vegetation index (NDVI) cameras), sensors (e.g., humidity, rain, wetness, wind, nutrient, temperature, sound, smell, thermal, UV etc.). However, methods will be described with the sensor being at least an imaging device able to produce geo-tagged images.

A manually recorded sample typically requires a person to visit a location and record a value. However, a sample may also be recorded without a person visiting a location. For example, a farm manager may use their expert knowledge to estimate a crop property (e.g., growth stage) of a crop. As another example, the farm manager or staff may export existing data from another system.

A sample recorded with the aid of a sensor is typically recorded by a person or a machine visiting a location and recording data. The sensor allowing an input of the crop data to be recorded with the sensor data. For example, a person with a camera may capture a photo and record their assessment of a crop property.

A sample recorded by a sensor itself is typically recorded by a person or machine visiting a location and recording data, or the sensor being fixed at a location and recording data about the crop. For example, a frost sensor may record the probability of frost at a particular fixed location. One or more samples may be recorded as part of a survey.

In one arrangement, each health-plot graphs one or more types of crop data across time. Each crop data may have a target value. For example, the target value may be a value that the crop data should be at the end of a growing season. Each health-plot may display the result of one or more surveys. As described below, the health-plots may comprise a yield plot and a maturity plot.

Each survey result may appear as a marker in a health-plot that contains user interface (UI) elements describing a summarised survey result and UI elements to describe a range associated with the survey result. The UI elements may describe a marker-centre, an upper marker-arm and a lower marker-arm.

The summarised survey result may be in the form of a statistical average, or mean. However, in other arrangements the summarised survey result may be something else like the median or a value manually selected when the sample was recorded manually. The range associated with the survey result may be the standard error multiplied by a factor, such as the confidence interval; or the range associated with the survey result may be in another form such as a manually entered range.

In one arrangement, the user may select one or more markers representing surveys displayed in a health-plot and may then see on a map a number, pattern, and location of sample sites that contributed to the survey of the selected markers. Such an arrangement enables a farm manager to understand how a crop was covered by the selected surveys and assists the farm manager in analysing the health-plot.

In one arrangement, when the user selects a portion of the marker on the health-plot, such as the portion belonging to marker-centre, the upper marker-arm, or the lower marker-arm, a subset of sample site locations is displayed on the map that corresponds to the selected portion and displays a required one or more of predetermined set of actions. The predetermined set of actions may correspond to the health-plot.

For example, when a survey whose marker-centre value is below the target and is selected the sample site locations recorded for the survey may be displayed on the map. An action to perform on the crop may also be presented in order for the marker-centre amount to be increased in the future. For example, the presented action may be to perform additional irrigation (if the health-plot is about yield estimation), which increases the weight of a crop (e.g., fruit). Additionally, a selection position on one of a plurality of health-plots may result in the display of a corresponding portion on another of the plurality of health-plots associated with a displayed subset of sample site locations. For example, as a result of a marker being selected, a portion of another health-plot which is related to the selected marker being below a target may be displayed.

In one arrangement, a selection position on one of a plurality of crop health-plots results in the display of a corresponding portion on another of the plurality of crop health-plots associated with a displayed subset of sample site locations.

In one aspect of the present disclosure, there is provided a method of managing crops using an electronic device having an interface, the method comprising:
 receiving inputs of crop data, each of which being associated with a sample site location corresponding to each of a plurality of images captured by an image capturing device;
 generating a graph plotting one or more types of crop data including data associated with the plurality of images in a first display region of the interface; and
displaying a subset of sample site locations on a map in a second display region of the interface based on a selection within one of plots on the graph.

In accordance with another aspect of the present disclosure, there is provided an electronic device for managing crops, the device comprising:
 a memory for storing data and computer program;
 a display for displaying an interface generated by the program;
 a processor coupled to the memory for executing the computer program, the computer program comprising instructions for:
 receiving inputs of crop data, each of which being associated with a sample site location corresponding to each of a plurality of images captured by an image capturing device;
 generating a graph plotting one or more types of crop data including data associated with the plurality of images in a first display region of the interface; and
 displaying a subset of sample site locations on a map in a second display region of the interface based on a selection within one of plots on the graph.

In accordance with still another aspect of the present disclosure, there is provided system for managing crops, the system comprising:
 a memory for storing data and computer program;
 a processor coupled to the memory for executing the computer program, the computer program comprising instructions for:
 receiving inputs of crop data, each of which being associated with a sample site location corresponding to each of a plurality of images captured by an image capturing device;
 generating a graph plotting one or more types of crop data including data associated with the plurality of images in a first display region of the interface; and
 displaying a subset of sample site locations on a map in a second display region of the interface based on a selection within one of plots on the graph.

In accordance with still another aspect of the present disclosure, there is provided a non-transitory computer readable medium having a program stored on the medium for managing crops, the program comprising:
 code for receiving inputs of crop data, each of which being associated with a sample site location corresponding to each of a plurality of images captured by an image capturing device;
 code for generating a graph plotting one or more types of crop data including data associated with the plurality of images in a first display region of the interface; and
code for displaying a subset of sample site locations on a map in a second display region of the interface based on a selection within one of plots on the graph.

Other aspects are also disclosed.

BRIEF DESCRIPTION OF THE DRAWINGS

One or more embodiments of the invention will now be described by way of one or more examples with reference to the following drawings, in which:

FIG. 12A shows an example map containing location pins;

FIG. 12B shows an example map containing location pins;

FIG. 12C shows an example map including circles of influence;

FIG. 12D shows an example map including pins which correspond to black circles in the map of FIG. 12C;

DETAILED DESCRIPTION INCLUDING BEST MODE

Figure 1:
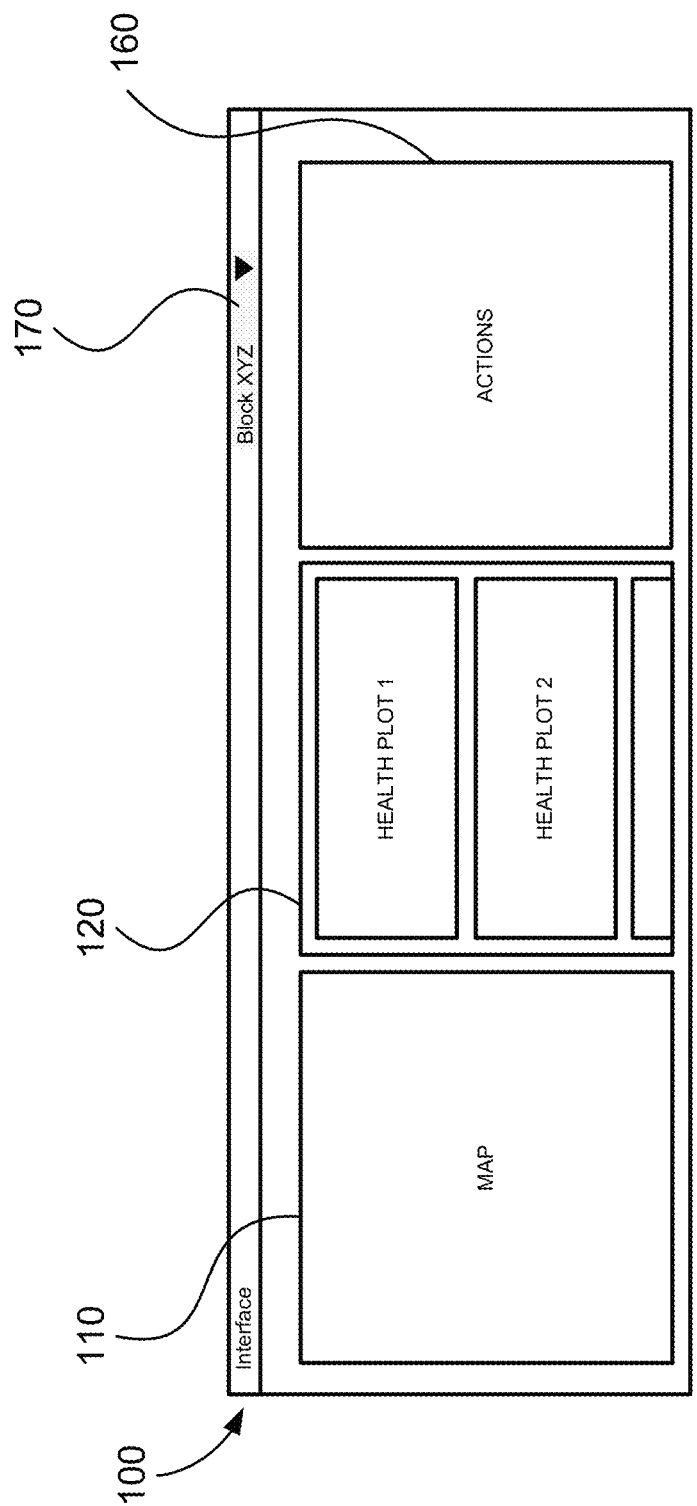
FIG. 1 shows an example user interface.
Figure 2A:
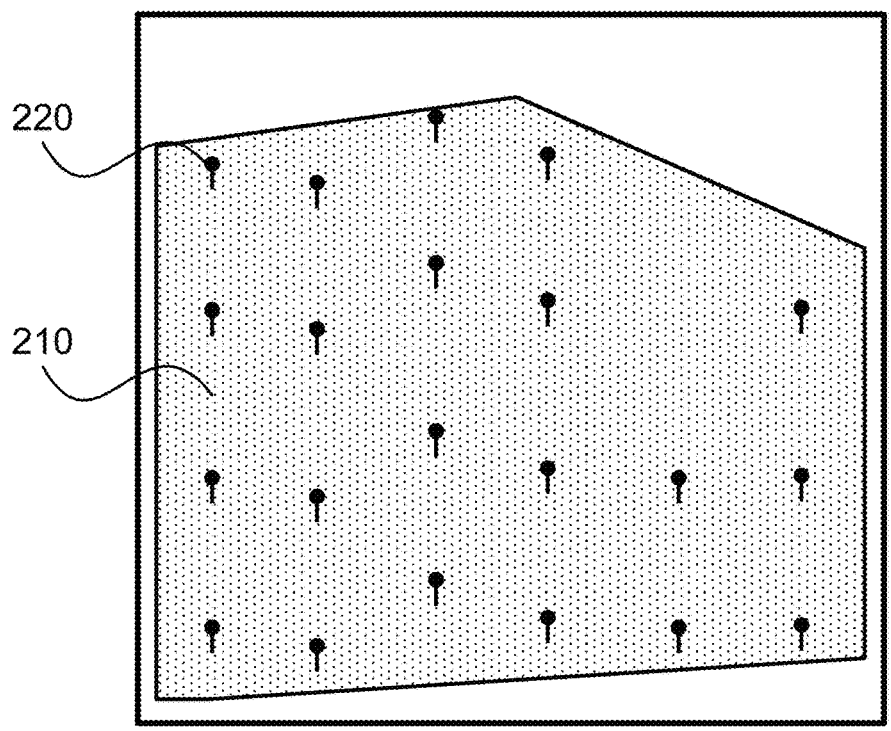
FIG. 2A is a user interface element displaying the location of sample sites on a map.
Figure 2B:
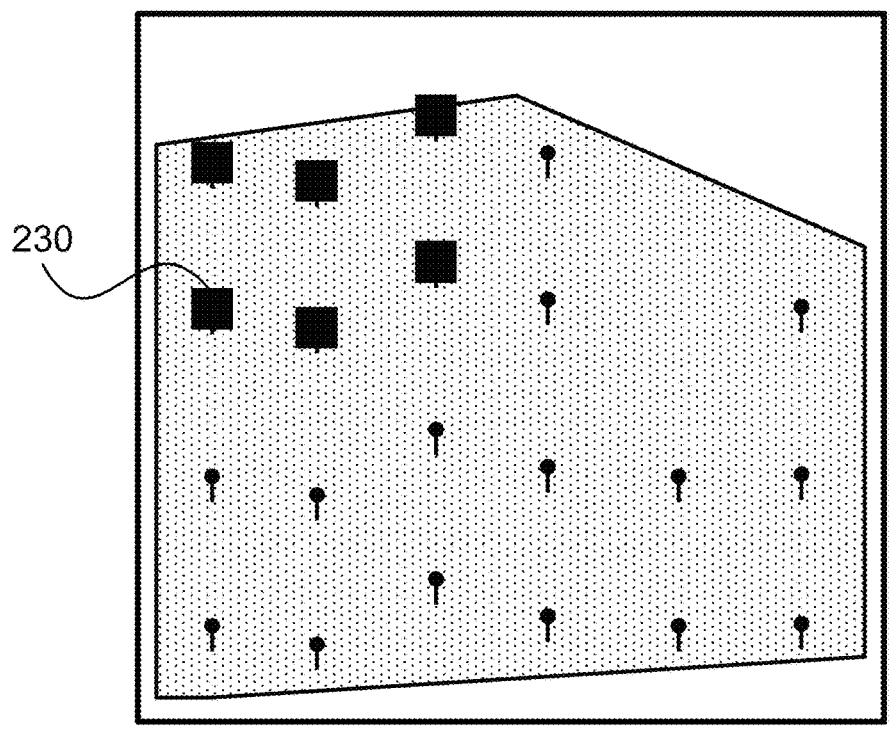
FIG. 2B shows a user interface element displaying a subset of sample site locations requiring one of a predetermined set of actions.

Where reference is made in any one or more of the accompanying drawings to steps and/or features, which have the same reference numerals, those steps and/or features have for the purposes of this description the same function(s) or operation(s), unless the contrary intention appears.

Figure 18A:
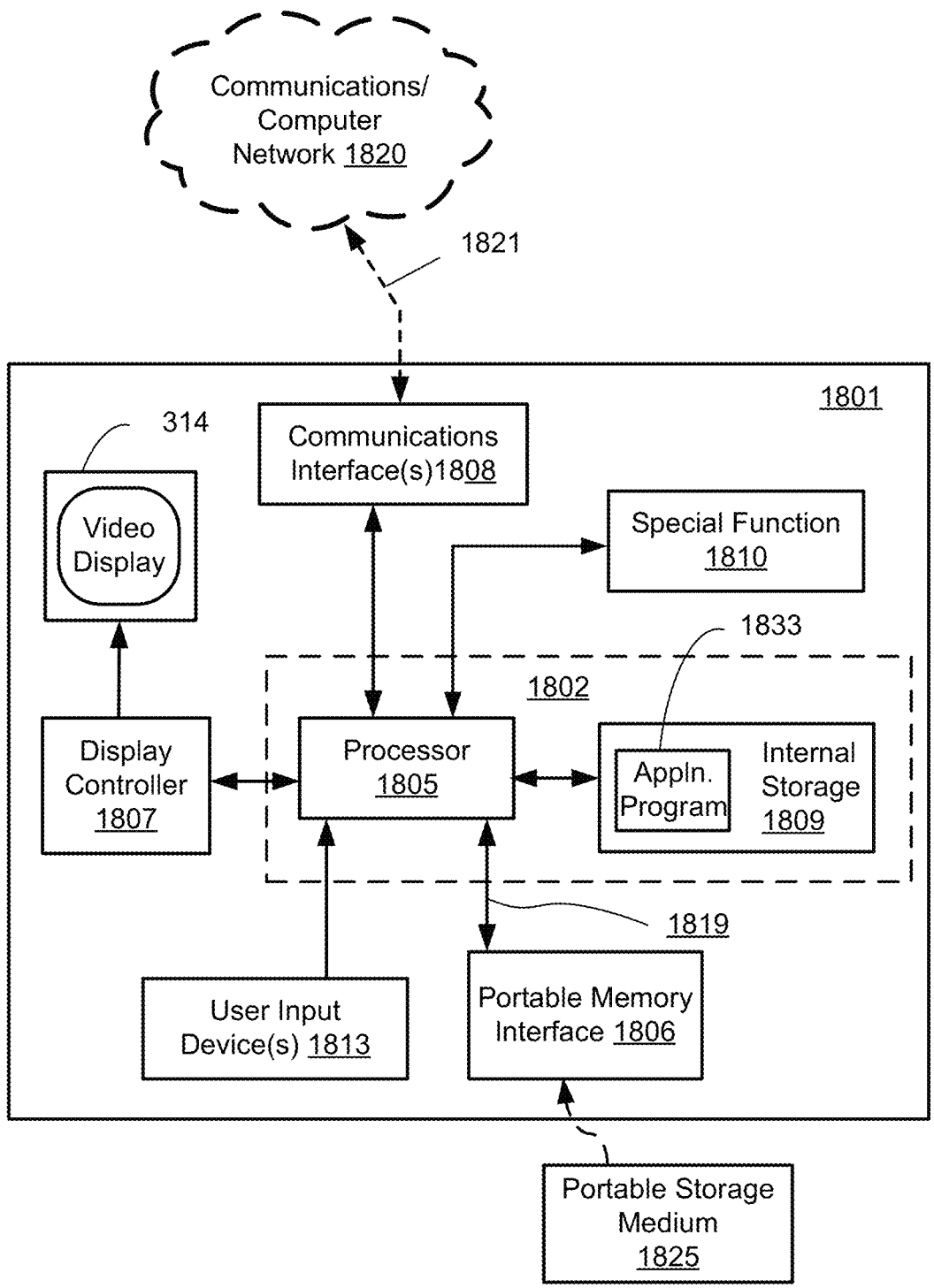
FIGS. 18A and 18B collectively form a schematic block diagram representation of an electronic device upon which described arrangements can be practised.
Figure 18B:
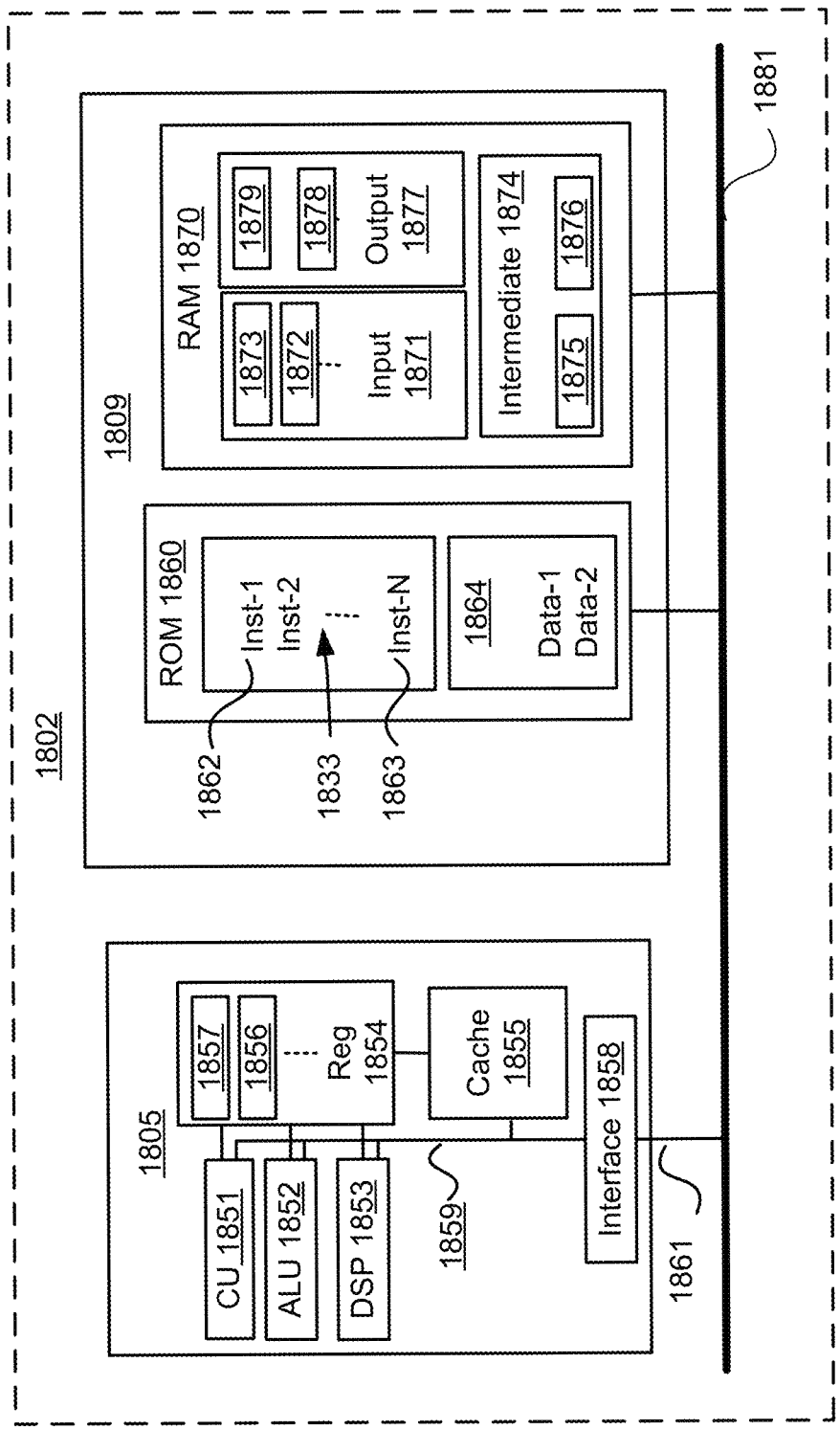
Figure 18C:
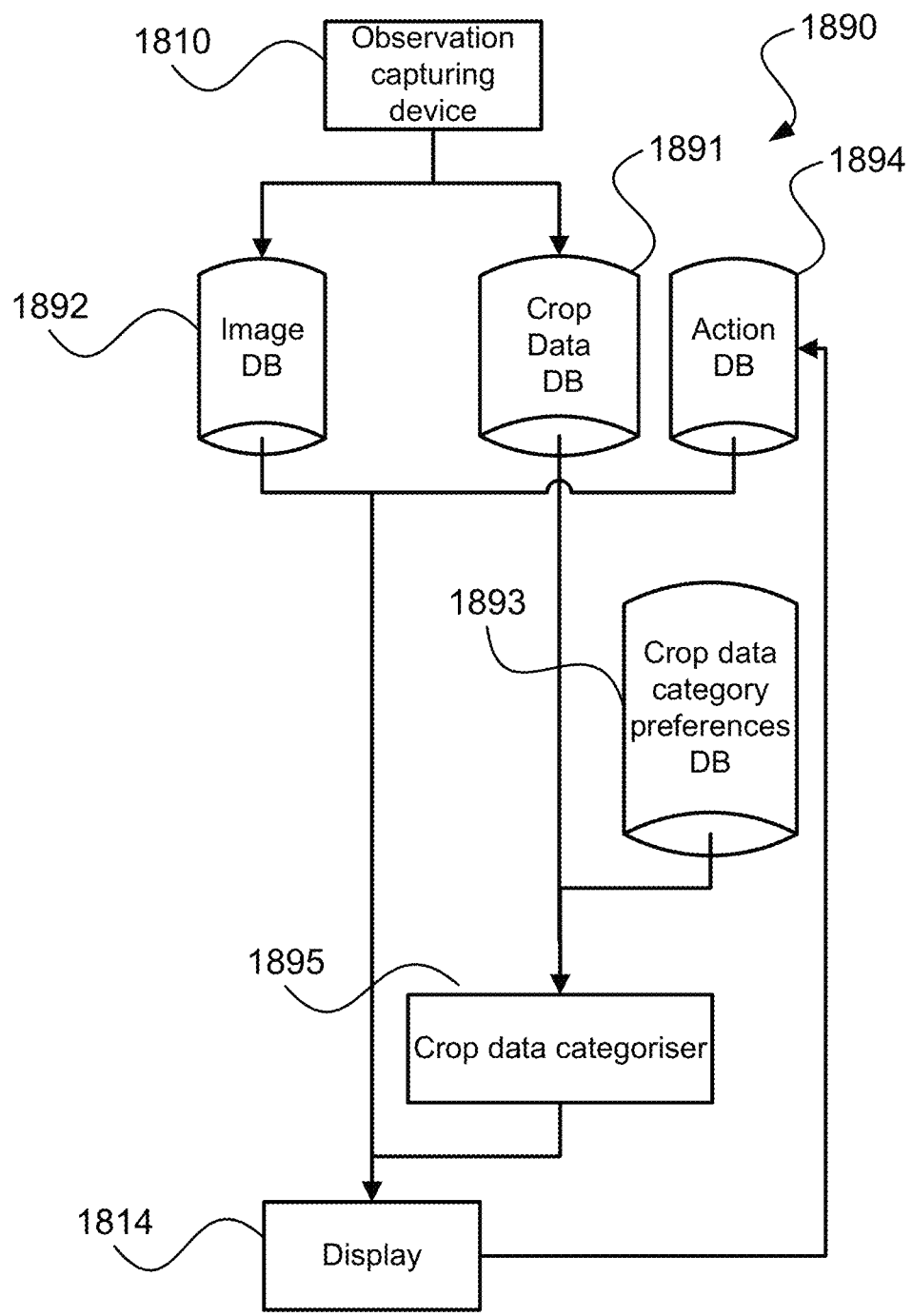
FIG. 18C is a system diagram showing a software arrangement for implementing described methods.

FIGS. 18A and 18B collectively form a schematic block diagram of a general purpose electronic device 1801 including embedded components, upon which methods to be described are desirably practiced. As described below, the electronic device 1801 may be used for managing crops using a user interface 100 (see FIG. 1) displayed on a video display 1814 of the device 1801.

The electronic device 1801 may be, for example, a tablet device, a mobile phone, a portable media player or a digital camera, in which processing resources are limited. Nevertheless, the methods to be described may also be performed on higher-level devices such as desktop computers, server computers, and other such devices with significantly larger processing resources.

As seen in FIG. 18A, the electronic device 1801 comprises an embedded controller 1802. Accordingly, the electronic device 1801 may be referred to as an "embedded device." In the present example, the controller 1802 has a processing unit (or processor) 1805 which is bi-directionally coupled to an internal storage module 1809. The storage module 1809 may be formed from non-volatile semiconductor read only memory (ROM) 1860 and semiconductor random access memory (RAM) 1870, as seen in FIG. 18B. The RAM 1870 may be volatile, non-volatile or a combination of volatile and non-volatile memory.

The electronic device 1801 includes a display controller 1807, which is connected to the video display 1814, such as a liquid crystal display (LCD) area or the like. The display controller 1807 is configured for displaying graphical images on the video display 1814 in accordance with instructions received from the embedded controller 1802, to which the display controller 1807 is connected.

The electronic device 1801 also includes user input devices 1813 which are typically formed by keys, a keypad or like controls. In some implementations, the user input devices 1813 may include a touch sensitive area physically associated with the display 1814 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 18A, the electronic device 1801 also comprises a portable memory interface 1806, which is coupled to the processor 1805 via a connection 1819. The portable memory interface 1806 allows a complementary portable memory device 1825 to be coupled to the electronic device 1801 to act as a source or destination of data or to supplement the internal storage module 1809. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 1801 also has a communications interface 1808 to permit coupling of the device 1801 to a computer or communications network 1820 via a connection 1821. The connection 1821 may be wired or wireless. For example, the connection 1821 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Figure 14:
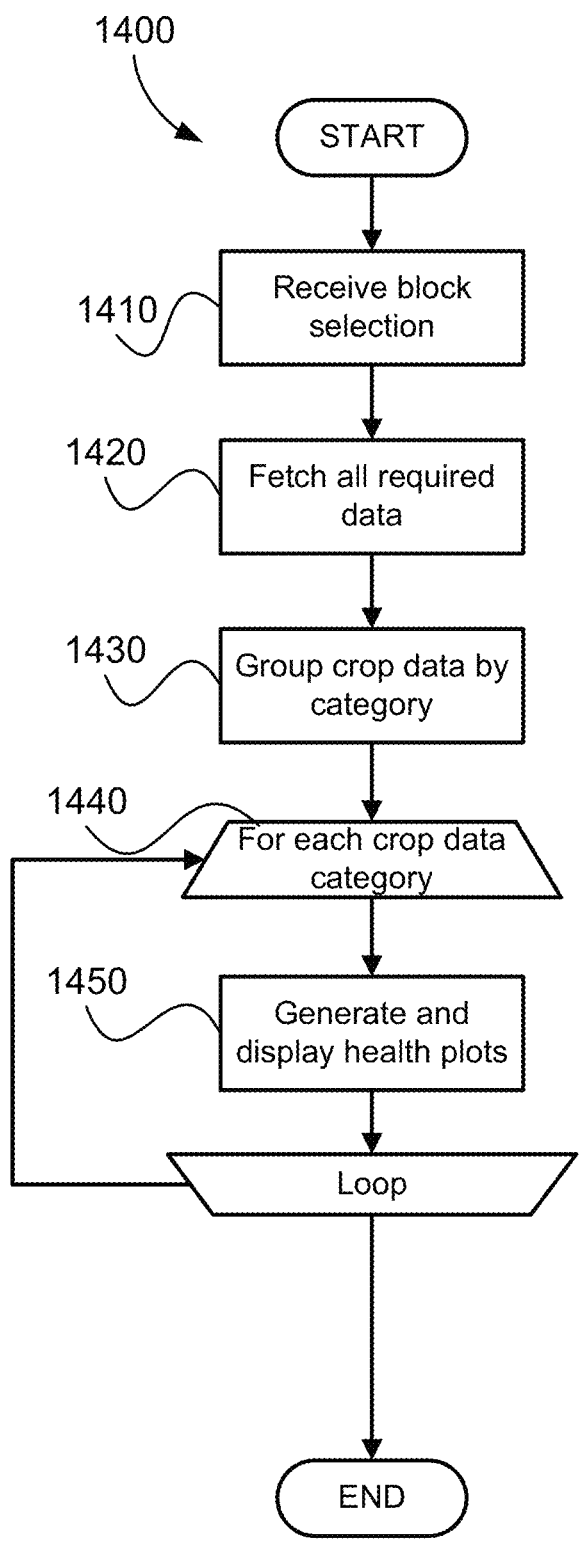
FIG. 14 is a schematic flow diagram showing a method of generating health-plots.
Figure 15:
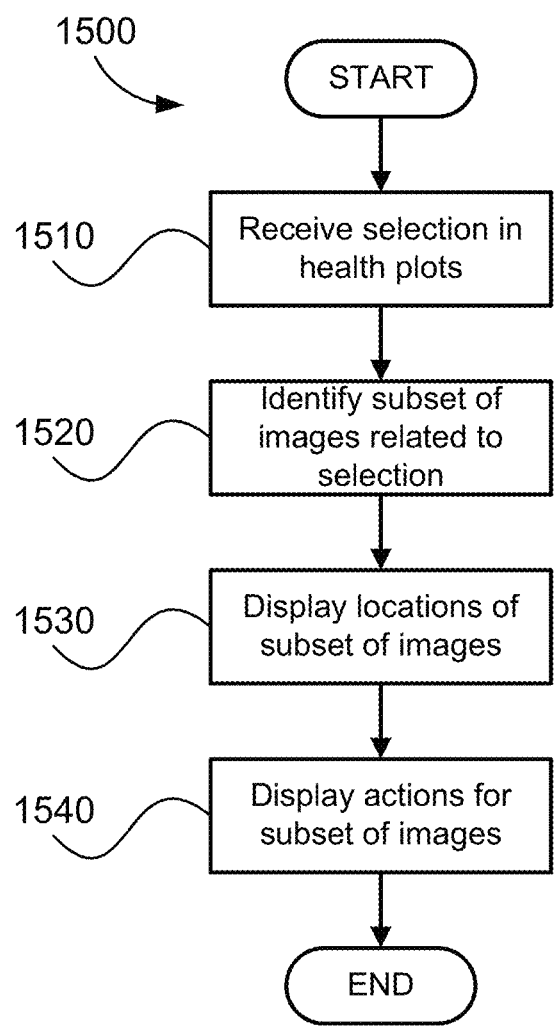
FIG. 15 is a schematic flow diagram showing a method of displaying actions for a subset of images.
Figure 16:
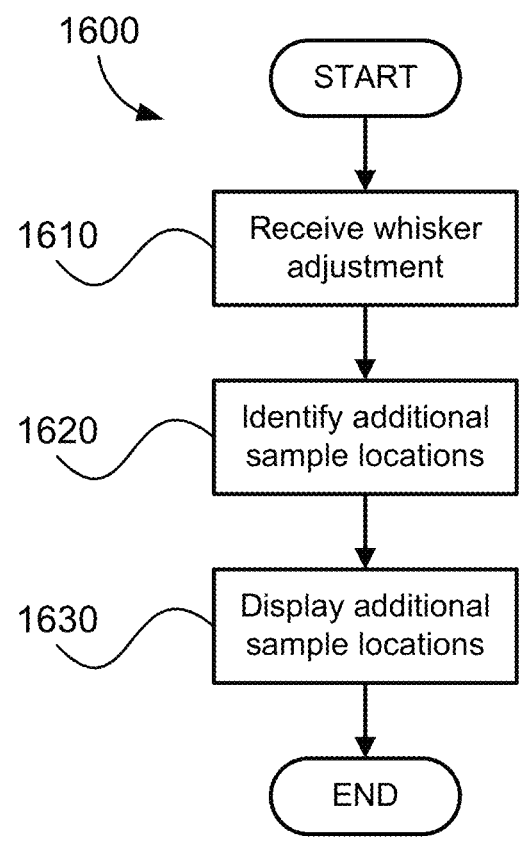
FIG. 16 is a schematic flow diagram showing a method of displaying sample locations.

The methods described hereinafter may be implemented using the embedded controller 1802, where the processes of FIGS. 14 to 16 may be implemented as one or more software application programs 1833 executable within the embedded controller 1802. The electronic device 1801 of FIG. 18A implements the described methods. In particular, with reference to FIG. 18B, the steps of the described methods are effected by instructions in the software 1833 that are carried out within the controller 1802. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 1833 of the embedded controller 1802 is typically stored in the non-volatile ROM 1860 of the internal storage module 1809. The software 1833 stored in the ROM 1860 can be updated when required from a computer readable medium. The software 1833 can be loaded into and executed by the processor 1805. In some instances, the processor 1805 may execute software instructions that are located in RAM 1870. Software instructions may be loaded into the RAM 1870 by the processor 1805 initiating a copy of one or more code modules from ROM 1860 into RAM 1870. Alternatively, the software instructions of one or more code modules may be pre-installed in a non-volatile region of RAM 1870 by a manufacturer. After one or more code modules have been located in RAM 1870, the processor 1805 may execute software instructions of the one or more code modules.

The application program 1833 is typically pre-installed and stored in the ROM 1860 by a manufacturer, prior to distribution of the electronic device 1801. However, in some instances, the application programs 1833 may be supplied to the user encoded on one or more CD-ROM (not shown) and read via the portable memory interface 1806 of FIG. 18A prior to storage in the internal storage module 1809 or in the portable memory 1825. In another alternative, the software application program 1833 may be read by the processor 1805 from the network 1820, or loaded into the controller 1802 or the portable storage medium 1825 from other computer readable media. Computer readable storage media refers to any non-transitory tangible storage medium that participates in providing instructions and/or data to the controller 1802 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 1801. Examples of transitory or non-tangible computer readable transmission media that may also participate in the provision of software, application programs, instructions and/or data to the device 1801 include radio or infrared transmission channels as well as a network connection to another computer or networked device, and the Internet or Intranets including e-mail transmissions and information recorded on Websites and the like. A computer readable medium having such software or computer program recorded on it is a computer program product.

The second part of the application programs 1833 and the corresponding code modules mentioned above may be executed to implement one or more graphical user interfaces (GUIs) to be rendered or otherwise represented upon the display 1814 of FIG. 18A. Through manipulation of the user input device 1813 (e.g., the keypad), a user of the device 1801 and the application programs 1833 may manipulate the interface in a functionally adaptable manner to provide controlling commands and/or input to the applications associated with the GUI(s).

Other forms of functionally adaptable user interfaces may also be implemented, such as an audio interface utilizing speech prompts output via loudspeakers (not illustrated) and user voice commands input via the microphone (not illustrated).

FIG. 18B illustrates in detail the embedded controller 1802 having the processor 1805 for executing the application programs 1833 and the internal storage 1809. The internal storage 1809 comprises read only memory (ROM) 1860 and random-access memory (RAM) 1870. The processor 1805 is able to execute the application programs 1833 stored in one or both of the connected memories 1860 and 1870. When the electronic device 1801 is initially powered up, a system program resident in the ROM 1860 is executed. The application program 1833 permanently stored in the ROM 1860 is sometimes referred to as "firmware". Execution of the firmware by the processor 1805 may fulfil various functions, including processor management, memory management, device management, storage management and user interface.

The processor 1805 typically includes a number of functional modules including a control unit (CU) 1851, an arithmetic logic unit (ALU) 1852, a digital signal processor (DSP) 1853 and a local or internal memory comprising a set of registers 1854 which typically contain atomic data elements 1856, 1857, along with internal buffer or cache memory 1855. One or more internal buses 1859 interconnect these functional modules. The processor 1805 typically also has one or more interfaces 1858 for communicating with external devices via system bus 1881, using a connection 1861.

The application program 1833 includes a sequence of instructions 1862 through 1863 that may include conditional branch and loop instructions. The program 1833 may also include data, which is used in execution of the program 1833. This data may be stored as part of the instruction or in a separate location 1864 within the ROM 1860 or RAM 1870.

In general, the processor 1805 is given a set of instructions, which are executed therein. This set of instructions may be organised into blocks, which perform specific tasks or handle specific events that occur in the electronic device 1801. Typically, the application program 1833 waits for events and subsequently executes the block of code associated with that event. Events may be triggered in response to input from a user, via the user input devices 1813 of FIG. 18A, as detected by the processor 1805. Events may also be triggered in response to other sensors and interfaces in the electronic device 1801.

The execution of a set of the instructions may require numeric variables to be read and modified. Such numeric variables are stored in the RAM 1870. The disclosed method uses input variables 1871 that are stored in known locations 1872, 1873 in the memory 1870. The input variables 1871 are processed to produce output variables 1877 that are stored in known locations 1878, 1879 in the memory 1870. Intermediate variables 1874 may be stored in additional memory locations in locations 1875, 1876 of the memory 1870. Alternatively, some intermediate variables may only exist in the registers 1854 of the processor 1805.

The execution of a sequence of instructions is achieved in the processor 1805 by repeated application of a fetch-execute cycle. The control unit 1851 of the processor 1805 maintains a register called the program counter, which contains the address in ROM 1860 or RAM 1870 of the next instruction to be executed. At the start of the fetch execute cycle, the contents of the memory address indexed by the program counter is loaded into the control unit 1851. The instruction thus loaded controls the subsequent operation of the processor 1805, causing for example, data to be loaded from ROM memory 1860 into processor registers 1854, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 1833, and is performed by repeated execution of a fetch-execute cycle in the processor 1805 or similar programmatic operation of other independent processor blocks in the electronic device 1801.

As seen in FIG. 18A, the electronic device 1801 also comprises a sensor such as an observation capturing device 1810. In one arrangement, the observation capturing device 1810 comprises a digital camera. The observation capturing device 1810 may also comprise other sensors such as a temperature, humidity, wind or thermal sensor. The observation capturing device 1810 may also comprise many other sensors.

The observation capturing device 1810, possibly in conjunction with the embedded controller 1802, is used to capture and record data representing observations. The observation capturing device 1810 is configured to record with each observation, data including a location where a data sample was captured in a format such as Longitude and Latitude, for example. The observation capturing device 1810 is also configured to record data about the subject either on captured observation metadata itself, or as a separate but associated record. The observation capturing device 1810 records the data about the subject by at least allowing the operator of the observation capturing device 1810 to enter the data to record either before, during, or after the capturing of the observation. The observation capturing device 1810 may also be configured, possibly in conjunction with the embedded controller 1802, to calculate by itself the data to record and then to record the data. For example, the observation capturing device 1810 may perform some analysis of the scene if the device 1810 comprises an optical sensor like a camera. In another example, the device 1810 comprises a temperature sensor configured to detect temperature without intervention. The observation capturing device 1810, or sensor, may also be configured externally from the electronic device 1801, to enable the observation capturing device 1810 to be mounted on a vehicle, autonomous or not, to record the data about the subject without the need of an operator.

For explanation purposes in describing the methods below, the observation capturing device 1810 in the form of an image capturing device, such as a camera, an RGB camera, an NDVI camera, an IR camera, or the like.

The data about the subject that the observation capturing device 1810 may record may include crop data. Crop data is data about a crop that is being grown in an agricultural setting, such as crops that may be grown on a farm, whether the crops are broad acre crops or smaller farms like vineyards. Other examples of crops are also possible. In a vineyard the crop is grapes, the grapes being grown on patches of land called a block. Vineyard staff or contractors look out for certain properties of their crops throughout a growing season. Such properties are referred to in the present description as crop data. Crop data may comprise values corresponding to one or more of a yield, maturity and disease of a crop at a corresponding sample site location. For example, the crop data may comprise: bud counts, bunch counts, weight of berries, weight of bunches, canopy density, pH, Ta, Brix, Baume, sugar levels, severity of disease, intensity of disease, incidence of disease, spread of disease, moisture levels, sunlight exposure, pruning properties, spray diaries, material being sprayed, treatment schedules, pesticides applied.

The properties of the crops may be grouped according to how the crops relate to the crop. For example, the yield of a crop is affected by bunch counts, pruning properties, weight of berries, weight of bunches, bud counts. The properties such as bunch counts, pruning properties, weight of berries, weight of bunches, bud counts may be referred to as Yield Estimation. The quality of a crop is affected by pH, Ta, Brix, Baume, sugar levels and moisture levels, which may be collectively referred to as Maturity. The health of a crop are affected by intensity, incidence, spread of disease, which may be collectively referred to as disease levels. Other groupings are possible.

The crop data is recorded typically as a result of surveys that vineyard staff perform in a vineyard. However, the crop data may also be recorded as a result of a scheduled, or on demand, reading performed by fixed or mobile sensors in the vineyard. The mobile sensors may be autonomous or mounted on other farm vehicles such as quad bikes, normal vehicles, tractors, side-by-side vehicles, motorbikes, harvesters, and the like. Each survey performed by the vineyard staff or sensors may span a few hours, a single day, or more, whether consecutive or not. However, a survey typically spans a single day or part thereof. Similarly, there may be more than one survey performed in a single day, either concurrently or not. Each survey performed by the vineyard staff may span one or more blocks, whether adjacent or not and may overlap with another survey. Each survey performed by the vineyard staff involves visiting zero or more locations within each of the surveyed blocks to collect crop data. The visited locations are known as sample sites. The case of zero locations being visited may occur when a vineyard staff member, normally a manager, uses their experience to determine the crop data for a block without visiting the block. In a case where a vineyard staff member uses their experience to determine the crop data for a block without visiting the block, the vineyard staff member may enter the crop data without a geo-tagged location but needs to at least indicate the block to which the entered crop data belongs. A vineyard staff member or automatic process may also import information from a separate system that contains crop data. As such, each survey represents a collection of crop data collected during the time span of the survey. The process of executing such a survey may also be referred to as sampling.

FIG. 18A shows a software architecture 1890 that may be used for implementing the described methods. A survey is performed to record crop data of at least one property of the crop. The crop data is recorded by the sensor such as the observation capturing device 1810 and is stored in a crop data database module 1891 configured, for example, within the storage module 1809. Images recorded by the observation capturing device 1810 are stored in an image database module 1892 configured within the storage module 1809. The locations of sample sites may also be stored within the sensor data images in the image database 1892 as metadata of the sensor data such as the image. As described below, a plurality of images captured by the observation capturing device 1810 (in the form of an image capturing device) may be received by the electronic device 1801. Each of the plurality of images may correspond to a sample site location and have crop data associated with the corresponding sample site location.

Crop data may be grouped into categories. A mapping for grouping crop data into categories is recorded in a database of crop data category preferences 1893 configured within the storage module 1809. The mapping may be used by a crop data categorizer module 1895 to group crop data. The crop data category preferences database 1893 is populated through a configuration process that associates crop data to a category. The configuration process may be implemented using any suitable "set-up" process or similar. The crop data categorizer module 1895 uses the information from the crop data category preferences database 1893 to create groups of crop data that are of the same category according to the crop data category preferences database 1893. Once the crop data categorizer module 1895 has categorised the crop data, the crop data categorizer module 1895 may continue to group by a survey that the crop data occurred under. Thus, all the crop data that occurred in a particular survey may be collated in a particular block, by category.

Each of the modules 1891 to 1895 may be configured as one or more software code modules of the software 1833 executable within the controller 1802.

The display 1814 may be used to display to the user a user interface such as the interface 100 shown in FIG. 1. The interface 100 displays on a map 110 (i.e., a display region of the interface 100) the sample site locations extracted from sensor data such as images in the image database 1892. The interface 100 displays in a graph area 120 (i.e., another display region of the interface 100) health-plots related to each type of crop data available in the crop data database 1891 after the crop data has been categorised by the crop data categorizer module 1895. The graph area 120 displays one or more health-plots in a scrollable area. The methods described below may be used for generating a plurality of health-plots in the graph area 120 of the interface 100 based on the crop data associated with a received plurality of images.

Finally, the display 1814 may also be used to display a listing of predetermined actions from an action database 1894 on actions area 160. The predetermined actions may correspond to one or more of the health-plots. Where the display 1814 is configured as a touch screen, the display 1814 may be used to receive new actions from the user and, in conjunction with the controller 1802, store the new actions into the action database 1894. As described in detail below, a subset of sample site locations requiring one of a predetermined set of actions may be displayed on the map area 110 of the interface 100 based on a selection within one of the plurality of crop health-plots displayed in the graph area 120.

The display 1814, in conjunction with the controller 1802, displays data on map area 110, graph area 120 and actions area 160 according to crop data available for the surveys that have been performed at the vineyard block selected by block selector 170. The block selector 170 is shown in FIG. 1 as a dropdown-combo box style of user control. If there is no block selected at 170 or if the selected block has no data then the map 110, graph area 120 and the actions area 160 are shown with no content other than the map 110 showing the selected block and any decorations drawn to highlight the area that the selected block covers. Decorations may include, for example, outlines or semi-transparent filled areas. In some arrangements the block selector 170 may allow multiple blocks to be selected, in which case the map 110 will scale to display a map that covers both blocks and allowing the user to pan and zoom and rotate.

A method 1400 of generating health-plots will now be described with reference to FIG. 14. The method 1400 may be implemented as one or more software code modules of the software application program 1833 resident in the ROM 1860 and being controlled in execution by the processor 1805. The health-plots generated using the method 100 are displayed in the user interface 100 on the display 1814.

The method 1400 begins at receiving step 1410, where selection of a block is received under execution of the processor 1805. The block selected at step 1410 may be a last block that a user selected when the user last used the device 1801. Alternatively, the block selected at step 1410 may be pre-selected with another block according to a default-block preference configured in an application preference. In another alternative, the block selected at step 1410 may be pre-selected with no selection. In still another arrangement the block selected at step 1410 will be the block for which a survey was most recently performed.

At fetching step 1420, all required data belonging to the block selected at 1410 is fetched from the image database module 1892, the crop data database module 1891, and the action database module 1894. The data may be fetched at step 1420 using any suitable database techniques. For example, a query, such an SQL query, may be performed to select all images that belong to the selected block, then a further query may be performed to select the crop data belonging to the selected block, and finally all actions belonging to the selected block. Then, at grouping step 1430, the crop data retrieved from the crop data database 1891 at step 1420 is grouped by the crop data categorizer module 1895. The crop data is grouped at step 1430 according to the crop data category preferences from the crop data category preferences database 1830. The crop data categorizer module 1895 uses the data stored in the crop data category preferences database 1893 to group all the data for a block according to the category to which the data belongs. For example, crop data for the selected block may include "bud count", "brix", "pH", "inflorescence count"—as an output of step 1430, the crop data categorizer module 1895 returns two groups. Group 1 being "Yield estimation"—containing "bud count" and "inflorescence count" crop data. Group 2 being "Maturity"—containing "brix", "pH" crop data.

Then, at looping step 1440, a loop begins iterating through each of the grouped categories of crop data grouped at the previous step 1430. At generating step 1450, a graph plotting one or more types of crop data is generated. In the present embodiment, for each of the grouped categories of crop data a health-plot is generated and displayed on the user interface 100 in the graph area 120. Each health-plot draws a plot of at least two axis, the horizontal axis typically being a temporal axis 13 such as a date or time; and the vertical axis being a value related to the crop data shown for that health-plot. An example of a health-plot is shown in FIG. 3A.

Figure 3A:
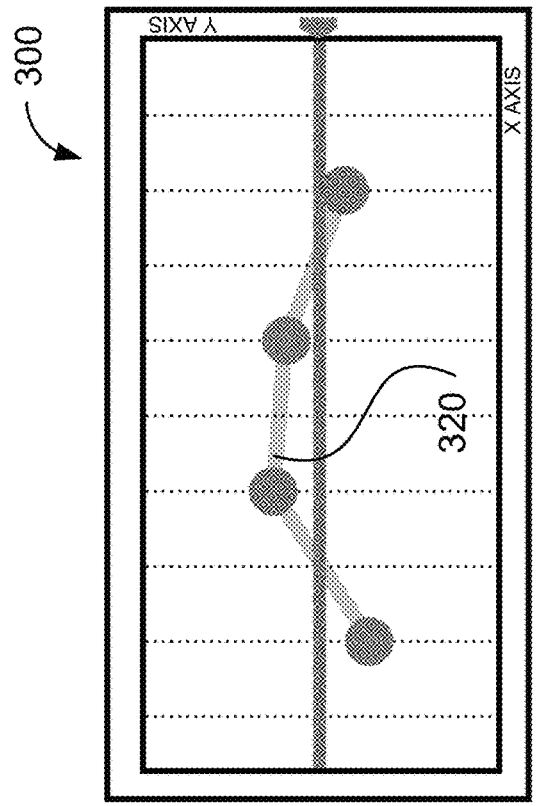
FIG. 3A shows an example health-plot displaying survey markers and a target-line.

In the example of FIG. 3A, the health-plot 300 is shown with icons including four markers 310, a target line 311 and a target line notch 312. The health-plot 300 is also shown with a y-axis 313, an x-axis 314 and period indicators 315. The health-plot 300 can scale, or zoom, and pan both horizontally, vertically or together at the same time through the use of commonly known gestures such as pinch to zoom or drag to pan. In one arrangement, a marker 310 represents a single x and y coordinate value and the marker 310 is shown for each survey that contained crop data belonging to the grouped category of crop data that the health-plot 300 displays. The marker 310 is shown in the example of FIG. 3A as a circle. However, the marker 310 may be of other shapes, such as triangles or squares or crosses, or otherwise, as shown for example in FIGS. 8A and 8B.

The x-axis for a health-plot is a time axis, whether the x-axis shows days, weeks, months or years will depend on a horizontal scale with period indicators 315 being provided to illustrate the scale. At the bottom of each period indicator 315, at the x-axis, there may also be a label shown indicating the value of that period. For example, label may be a date, or a week number, or a month, etc. A marker 310 is positioned at an x-value corresponding to the survey the marker 310 represents. If a survey spanned as single day, or less, then the marker 310 appears at the x value corresponding to either the earliest, or the mean, or the last crop data collected according to a user preference. If a survey spanned more than a day then the marker will appear at the x value corresponding to either the earliest, or the median, or the last crop data collected; or the start, middle, or end of the survey span.

The x-axis of a health-plot may be shown in terms of a growing season. The whole-span of the health-plot may represent an entire growing season. For example, the health-plot may represent data from September to August, with the left-most x-value being September 1 and the right-most x-value being August $31^{st}$ the following year. The starting and ending dates for a season may be a user-configurable parameter. Having the dates being season-based enables season comparison. So, one health-plot may be displayed showing yield for the 2010 season and another health-plot may also show yield for the 2012 season, similarly a health-plot containing more than one series, as will be described below with reference FIG. 8A, can have each series belonging to a different season; thus enabling an easy comparison between one or more seasons and for one or more grouped crop data type.

The y-axis of a health-plot is a value axis. Each marker 310 has as a y-value, being a value related to the crop data corresponding to the survey related to the marker 310 but after conversion has been performed. A conversion is necessary to aggregate the crop data in the survey to a single value that can be plotted as the marker 310. One method of aggregating the value is to perform statistical calculations such as taking the mean crop data value. Additionally, further conversions may be required when converting crop data that itself has incompatible values.

For example, a health-plot displaying "Yield estimation" crop data category may refer to a first survey of an "inflorescence count" crop data and a second survey of a "bunch count" crop data and a third data of "actual yield" crop data. As the first two surveys of such an example are of a different count crop data and the third is an actual yield, it does not make sense to plot the surveys without conversion. Instead, the "inflorescence count" of the first survey and the "bunch count" of the second survey may be converted into a "yield" value and plotted into a health-plot where the y-axis represents the "yield". Once converted, all three surveys may be plotted together in the "yield estimation" health-plot with the first marker 310 being the predicted yield for "inflorescence count", the second marker 310 being the predicted yield for "bunch count" and the third marker 310 being the actual yield as recorded during harvest time. An example formula for the conversions is shown below:

$$\text{Predicted Yield} = \text{Average inflorescence count}$$
$$\times \text{Percent of inflorescences expected}$$
$$\text{to survive to harvest}$$
$$\times \text{Expected weight of bunch at harvest}$$

Target line 311 represents a target of the y-value of the health-plot 300. In the above example, target line 311 corresponds to the desired amount of yield at the time of harvest. A target line notch 312 is provided as a user interface widget to facilitate the moving of the target line 311 in response to the user operations. The target line 311 serves the purpose of illustrating how the surveys compare to the target. A user may configure a health-plot to either display or not display the target line 311, although a target may still be set. Alternatively, no target may be set for a health-plot.

Figure 3B:
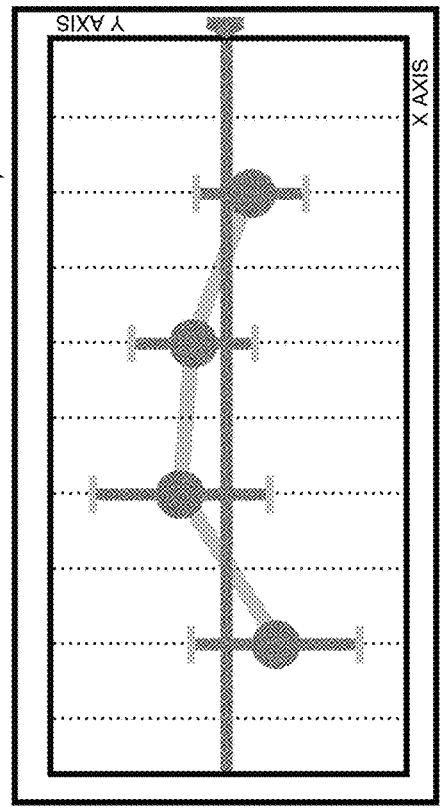
FIG. 3B shows an example health-plot displaying survey markers with a marker-line and a target-line.

FIG. 3B extends FIG. 3A by introducing marker-line 320 to the health-plot 300. The marker-line 320 is displayed according to a user preference set per health-plot. The marker-line 320 joins the value of each marker 310 that is displayed with a line. The line used to join each marker 310 is typically a straight line but may in other arrangements be a curve that smooths-out the angles while touching each marker 310. The marker-line 320 is used to illustrate a possible transition between the y-values of two markers over time.

Figure 3C:
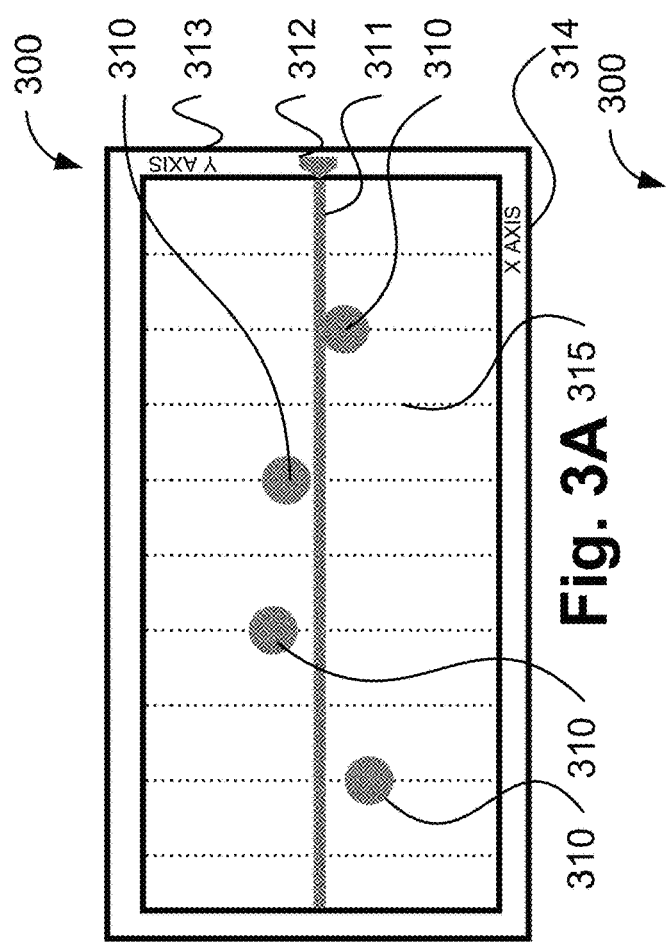
FIG. 3C shows an example health-plot displaying survey markers and corresponding upper and lower marker-arms and a target-line.

FIG. 3C shows the example health-plot 300 of FIG. 3A comprising a lower marker-arm 330 and an upper marker-arm 331. The upper marker-arm 331 and lower marker-arm 330 represent an upper and lower estimate of the value of the survey of the marker to which the the upper marker-arm 331 and lower marker-arm 330 are attached. The lower marker arm 330 and upper marker-arms 331 are displayed according to the user preference set per health-plot, with preferences including a) whether the marker arms are to be displayed, and b) the value of the marker arms.

In one arrangement, a variance range may be determined for a predetermined survey action (e.g., pruning, spraying) based on variation in values corresponding to one type of crop data (e.g., yield data) associated with a received plurality of sample sites in a block. The variation in values may be a statistical variance. A modifiable variance icon (e.g., a bar) may be displayed in one crop health-plot in the graph area 120 (i.e., a first display region of the interface 100) corresponding to the determined variance range. For example, the value of the upper and lower marker-arm determines the y-value of the upper marker-arm 331 and the lower marker-arm 330. The value of the upper and lower marker-arm may be a statistical measure such as the standard error multiplied by a factor such as the confidence interval. As described above, the lower marker arm 330 and upper marker-arms 331 are displayed according to the user preference set per health-plot. In one arrangement, the value of the upper and lower marker-arm may be values entered by a vineyard staff member as part of an expert assessment of the crop data for a block for the survey.

In one arrangement, one or more further sample site locations to be scored in a block may be displayed in the map 110 (i.e., a second display region of the interface 100) based on an extent of modification to the displayed variance icon and a current target value (e.g., as represented by the target line) of the predetermined survey action.

Figure 3D:
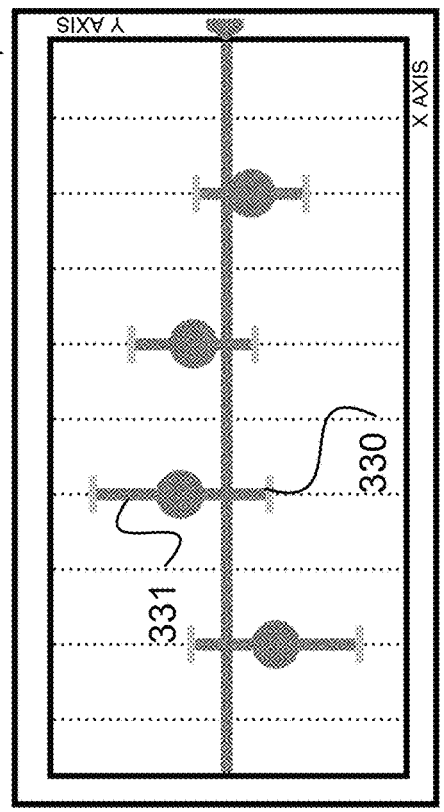
FIG. 3D shows an example health-plot displaying survey markers with upper and lower marker-arms, a marker-line and a target-line.

FIG. 3D shows the health-plot 300 comprising the marker-line 320, upper marker-arm 331 and lower marker-arm 330.

Figure 4A:
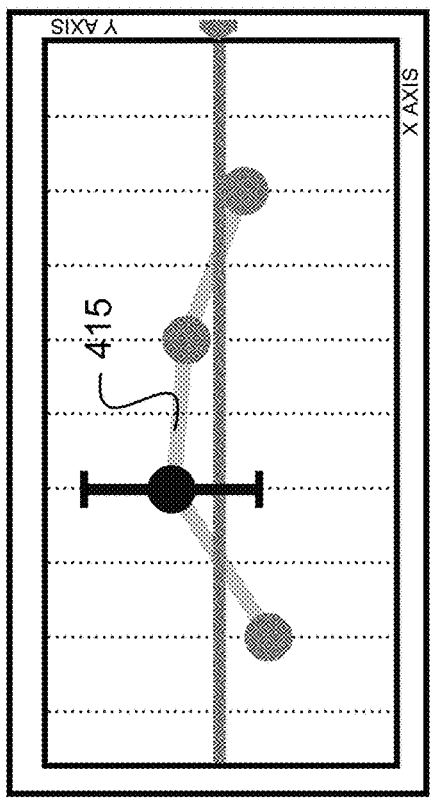
FIG. 4A shows a health-plot displaying survey markers and a target-line where one of the surveys markers is selected and showing the selected marker with upper and lower marker-arms.
Figure 5:
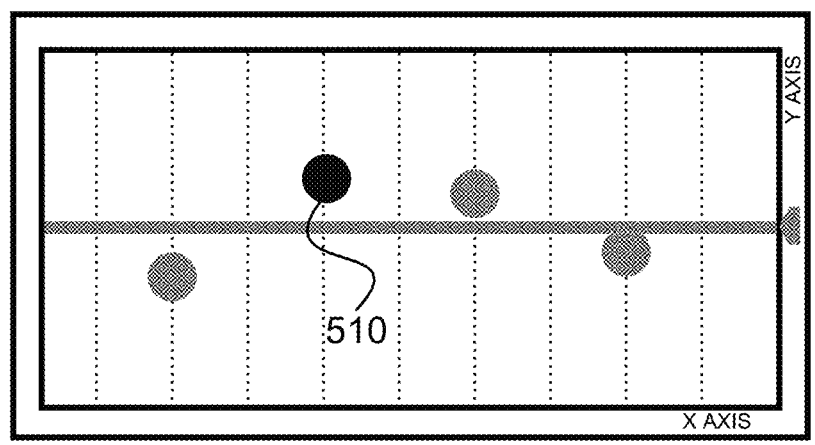
FIG. 5 shows a health-plot displaying survey markers and a target-line, where one of the surveys markers is selected and no upper and lower marker-arms are displayed.

In a further arrangement, a health-plot may be shown normally without the upper and lower marker-arms, unless the marker to which the upper and lower marker-arms belong has been selected, or activated, by the user. For example, in FIG. 4A shows a health-plot comprising a non-selected marker 400 without upper and lower marker-arms. The health-plot 400 of FIG. 4A also comprises a selected marker 410 with an upper marker-arm 420 and a lower marker-arm 430. The selected marker 410 is shown in the example of FIG. 4A to be distinguishable from the non-selected marker 400 by displaying the marker 410 in a different colour. However, in other arrangements the selected marker 410 may be distinguished using other techniques such as enlarging the marker 410 (e.g., like bold text), or animating the marker 410 (e.g., using a pulsating animation, or varying the colour of the marker 410). In another arrangement, the marker 410 may actually rely solely on the fact that the lower and upper marker-arms are now present when the marker 410 is selected whereas when marker 410 was unselected the lower and upper marker-arms were not shown. Selection of the selected marker 410 will be described further below. Similarly, the health-plot 400 may be configured to not display the upper and lower marker-arms even if a marker has been selected. For example, FIG. 5 shows a health-plot 500 where a marker 510 is selected but has no upper or lower marker-arms displayed.

Figure 4B:
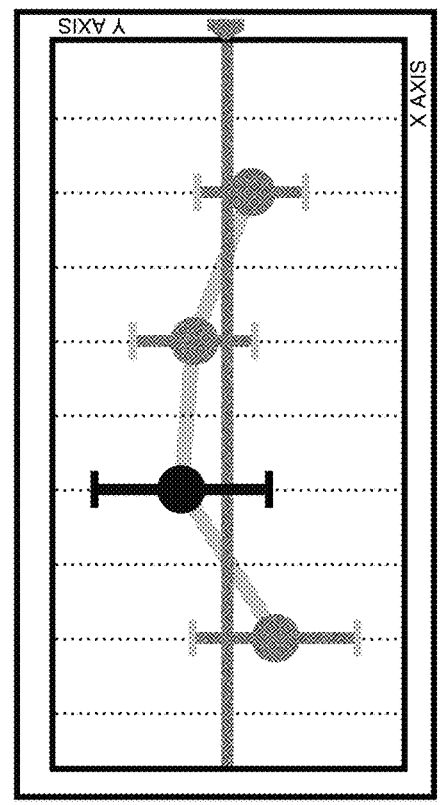
FIG. 4B shows a health-plot displaying survey markers with a marker-line and a target-line—with one of the surveys markers selected and showing the selected marker with upper and lower marker-arms.

FIG. 4B shows the health-plot 400 of FIG. 4A with a marker-line 415 displayed.

Figure 4C:
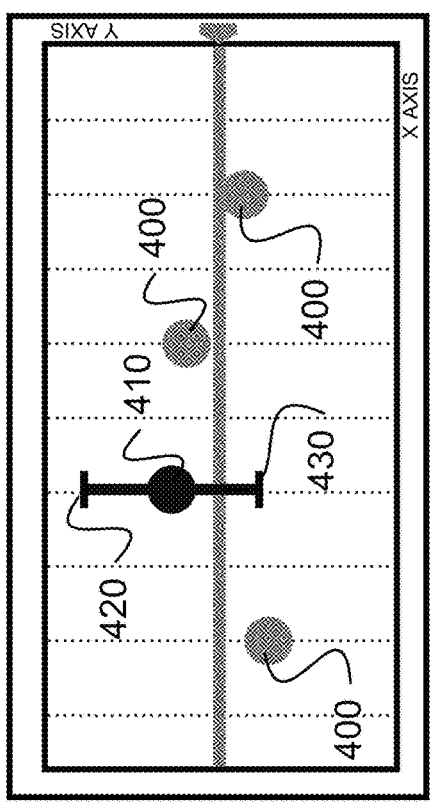
FIG. 4C shows a health-plot displaying survey markers with corresponding upper and lower marker-arms and a target-line where one of the surveys markers is selected.
Figure 4D:
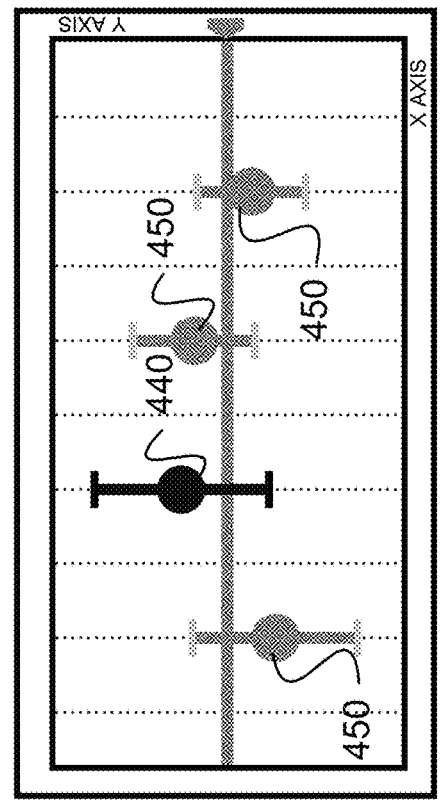
FIG. 4D shows a health-plot displaying survey markers and their upper and lower marker-arms with a marker-line and a target-line—with one of the survey markers selected and showing its upper and lower marker-arms.

FIG. 4C shows the health-plot 400 of FIG. 4A where the unselected markers also display corresponding upper and lower marker-arms. In the example of FIG. 4C, it is necessary to be able to distinguish the selected marker 440 from the unselected markers 450 as described previously, so the selected marker 440 is shown in a different colour to the other markers 450. FIG. 4D shows a combination of FIG. 4B and FIG. 4A where both the upper and lower marker-arms are always visible and the marker-line is displayed in the health-plot 400 of FIG. 4D.

Figure 6A:
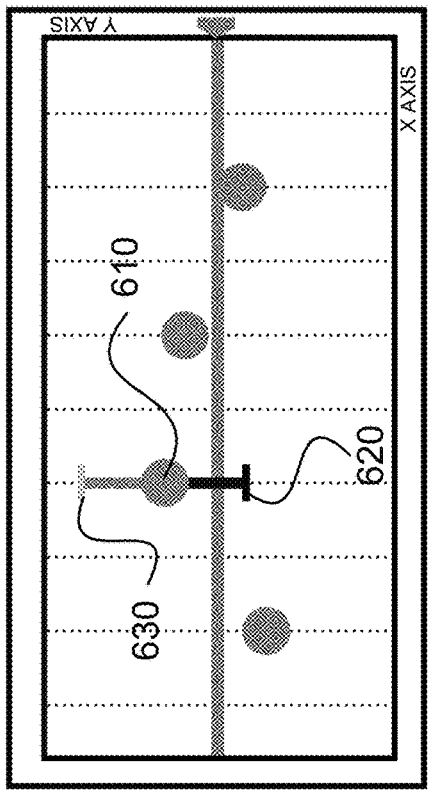
FIG. 6A shows a health-plot displaying survey markers with a selected survey having a marker-centre selected.
Figure 6B:
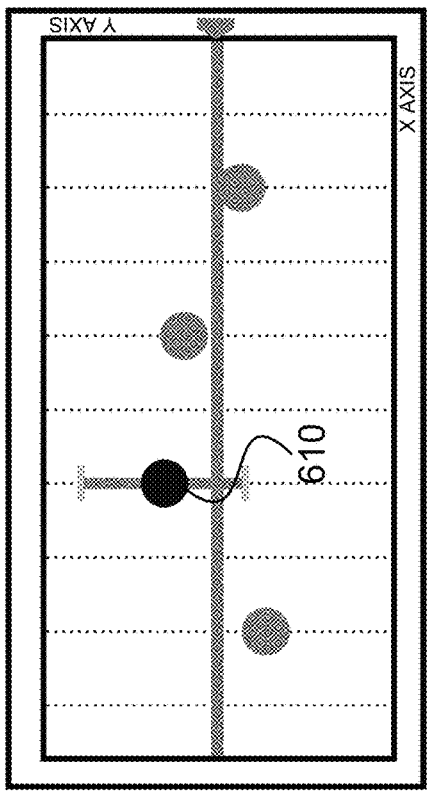
FIG. 6B shows the health-plot of FIG. 6A displaying survey markers with the selected survey having a lower marker-arm selected.
Figure 6C:
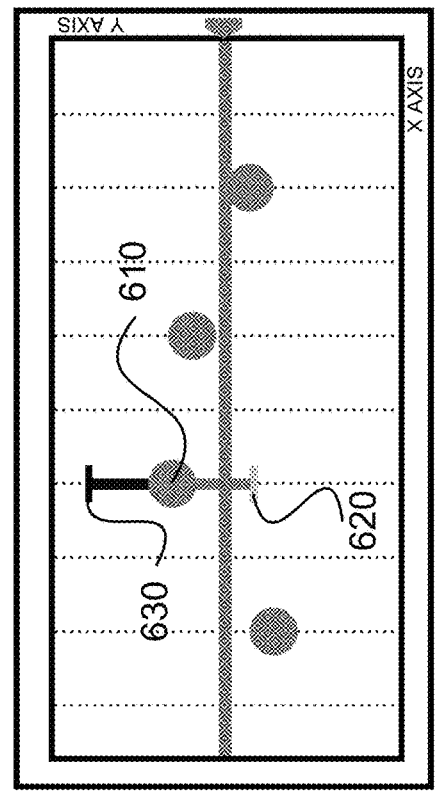
FIG. 6C shows the health-plot of FIG. 6A displaying survey markers with the selected survey having an upper marker-arm selected.

FIGS. 6A, 6B and 6C show example health-plots to illustrate modes of operation that extend the selection functionality previously described of selecting a marker, such as the selected marker 440 to selecting either the marker-centre, or an upper marker-arm, or a lower-marker arm. For example, in the example health-plot 600 of FIG. 6A, marker 610 has been selected by itself, independently of corresponding upper and lower marker-arms. In the example of FIG. 6B, the health-plot 600 is shown with a lower marker-arm 620 of the marker 410 selected independently of an upper marker-arm 630 or the marker-centre itself. In the example of FIG. 6C, the health-plot 600 is shown with the upper marker-arm 630 of the marker 610 selected independently of the lower marker-arm 620 or the marker-centre.

Figure 7A:
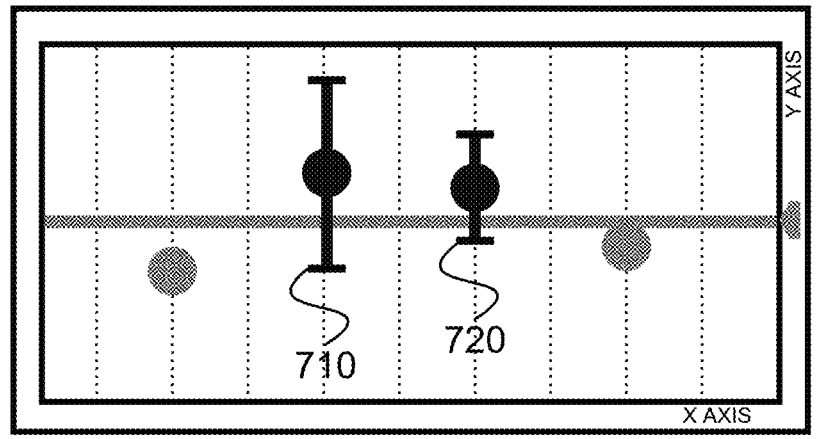
FIG. 7A shows a health-plot displaying two survey markers being selected.
Figure 7B:
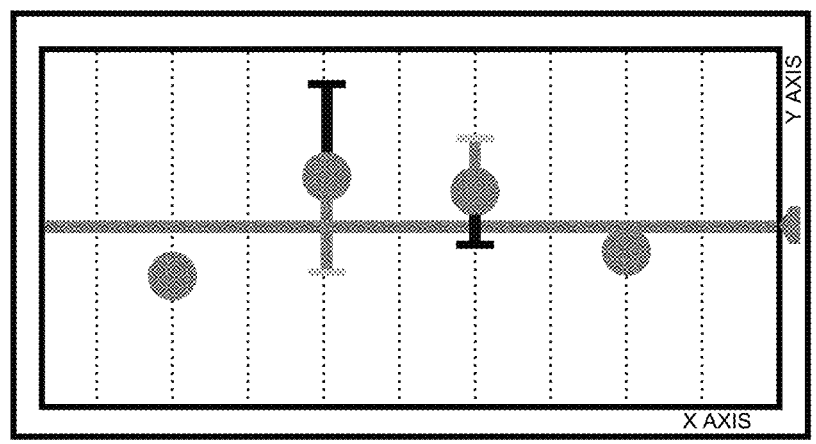
FIG. 7B shows a health-plot displaying survey markers, where one of the markers has a corresponding lower marker-arm selected and another marker has a corresponding upper marker-arm selected.

FIG. 7A shows an example health-plot 700 where more than one marker is selected in the health-plot 700. In the example of FIG. 7A, both the marker 710 and 720 are selected. The selection process of FIG. 7A may have occurred as a result of a user selecting both markers simultaneously, as is possible with a touch screen or by dragging a selection rectangle across both markers. Alternatively, the markers 710 and 720 may have been selected one after the other using any suitable method such as the user of a keyboard key such as Shift, Control, or Alt. FIG. 7B shows the health-plot 700 of FIG. 7A where specific marker-arms are selected individually, but not the corresponding marker itself. Other combinations of marker and marker-arm selections are possible in other arrangements.

Figure 8A:
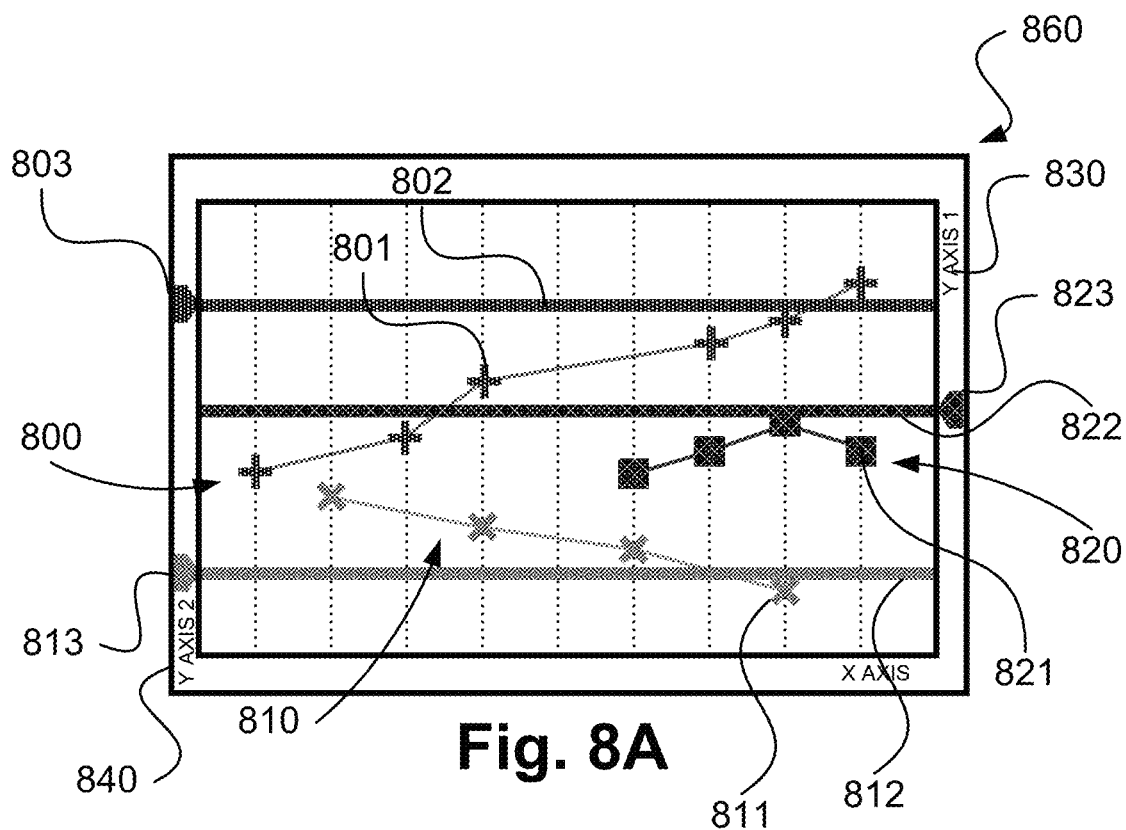
FIG. 8A shows an example health-plot displaying multiple types of crop data plotted on the graph, each crop data having various survey markers.

The graph area 120, as previously described, may display more than one health-plot in a scrollable area. However, multiple plots may be presented together in a single health-plot. For example, in FIG. 8A, there are shown three (i.e., series 800, series 810 and series 820) series of markers and respective marker-lines, and target lines in the same health-plot 850. In the example of FIG. 8A, each of the series has a marker that is displayed differently such as series 800 having a marker 801, series 810 having a marker 811 and series 820 having a marker 821. In the example of FIG. 8A, the markers 801, 811 and 821 appear to have a different shape and colour. However, in another arrangement the markers 801, 811 and 821 may instead vary due to shape, colour, tone, size, orientation, animation, or another other suitable option. However, it is important that the user be able to associate a target-line and target-line-notch with a respective series. In the example of FIG. 8A, the series 800 contains markers 801 and a target line 802. The target 802 line is displayed in a manner that the user can visually associate the target line 802 with the markers 801. For example, the target line 802 with the markers 801 may be displayed in the same colour, but with consideration for the other colours of the other series, to avoid having more than one series with a similar or exact colour. As an example, series 800 may have markers 801 being blue and the target line 802 also being blue; series 810 may have markers 811 and target line 812 being green; and series 820 may have markers 821 and target line 822 being red.

Furthermore, the example of FIG. 8A demonstrates that it is possible to display multiple series on a single health-plot 850 that do not have markers on the same days and the day span may not be the same for each of the series. In the example health-plot 850 of FIG. 8A, series 800 has markers that occur before a first marker of series 810 and after a last marker of series 810. However, the day when the marker 801 occurs also has a corresponding marker for series 810. It is also possible, to have two series that do not overlap at all in terms of the day span.

Furthermore, the example health-plot 850 of FIG. 8A demonstrates that the target-line notches 803, 813 and 823 are placed on either the y-axis 830 or the y-axis 840. Placing the target-line notches 803, 813 and 823 on either the y-axis 830 or the y-axis 840 places a restriction on the series that may be drawn on a single health-plot. That is, as long as a displayed series can present corresponding values in one or the other values of the two y-axis then the series may be displayed. In the example of FIG. 8A, series 800 is shown to share the y-axis 840 with the series 810, by target-line notch 813 of the series 810 being placed on the y-axis 840 and the target-line notch 803 of the series 800 also being placed on the y-axis 840. In the example of FIG. 8A, series 820 is shown to have a target-line notch 823 being placed on the y-axis 830. However, in another arrangement, the y-axis 840 and y-axis 830 may actually be the same and the notches on either side placed there for ease of use.

Figure 8B:
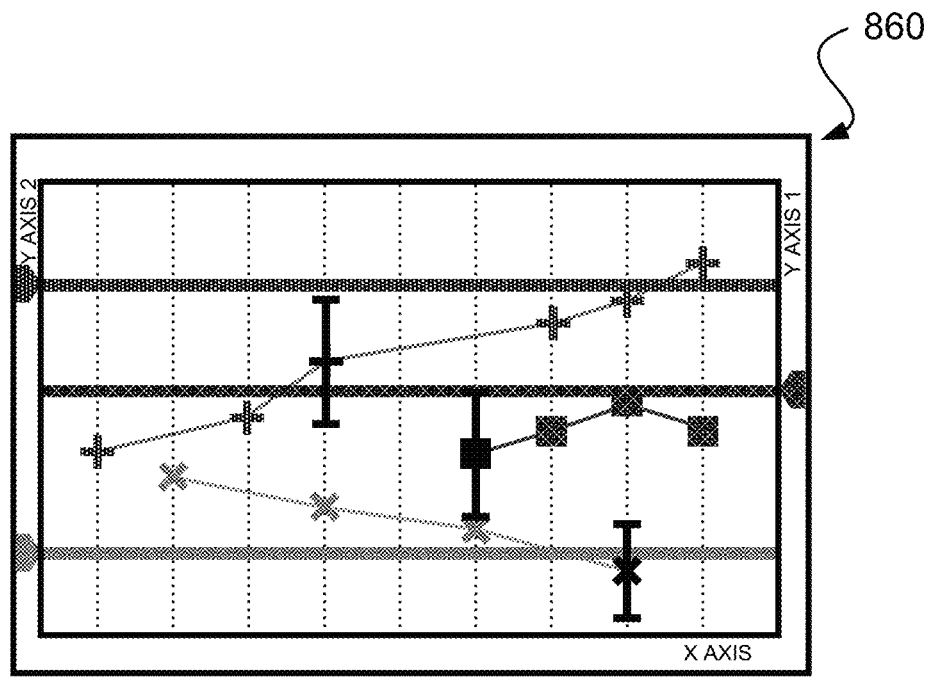
FIG. 8B shows an example health-plot displaying multiple types of crop data plotted on the graph, each crop data having various survey markers where some markers are selected.

FIG. 8B shows an example health-plot 860 with different markers of different series on the health-plot 860. Like in previously described examples, selection may affect a single marker on a single series, or multiple markers on multiple series; equally, upper or lower marker-arms may also be selected as described above.

A method 1500 of displaying actions for a subset of images, will now be described with reference to FIG. 15.

The method 1500 may be implemented as one or more software code modules of the software application program 1833 resident in the ROM 1860 and being controlled in execution by the processor 1805.

In response to a selection of a marker, or marker-arm on a health-plot, as described above, a method 1500 is executed under execution of the processor 1805. The method 1500 begins at receiving step 1510, where a selection a marker is received. For example, a user may select a marker using the display 1814 displaying a health-plot in the user interface 100. According to the selection made at step 1510, at identifying step 1520 a subset of images is identified, under execution of the processor 1805, according to the selection. Locations of the images will then be displayed on the map 110 as described in detail below. Then, actions related to the identified subset of images will be displayed on the action area 160 as described in detail below.

At step 1520, a subset of images to display, related to the selection on the displayed health-plot, is identified under execution of the processor 1805. In the case of a single marker being selected, as shown in FIG. 4A, the identified subset of images corresponds to the whole survey of the selected marker. In the case of a lower marker-arm being selected then the identified images are those images whose crop data are below the mean for the survey of the corresponding marker. In the case of an upper marker-arm being selected, the identified images are those images whose crop data are above the mean for the survey of the corresponding marker. In the case of the marker-centre being selected then the identified images are those images whose crop data matches the mean of the survey of the corresponding marker. In practice, however, when the marker-centre is selected there will typically be at least one image identified corresponding to the mean. Alternatively, more images whose crop data also matches that of the mean may be identified.

Figure 10A:
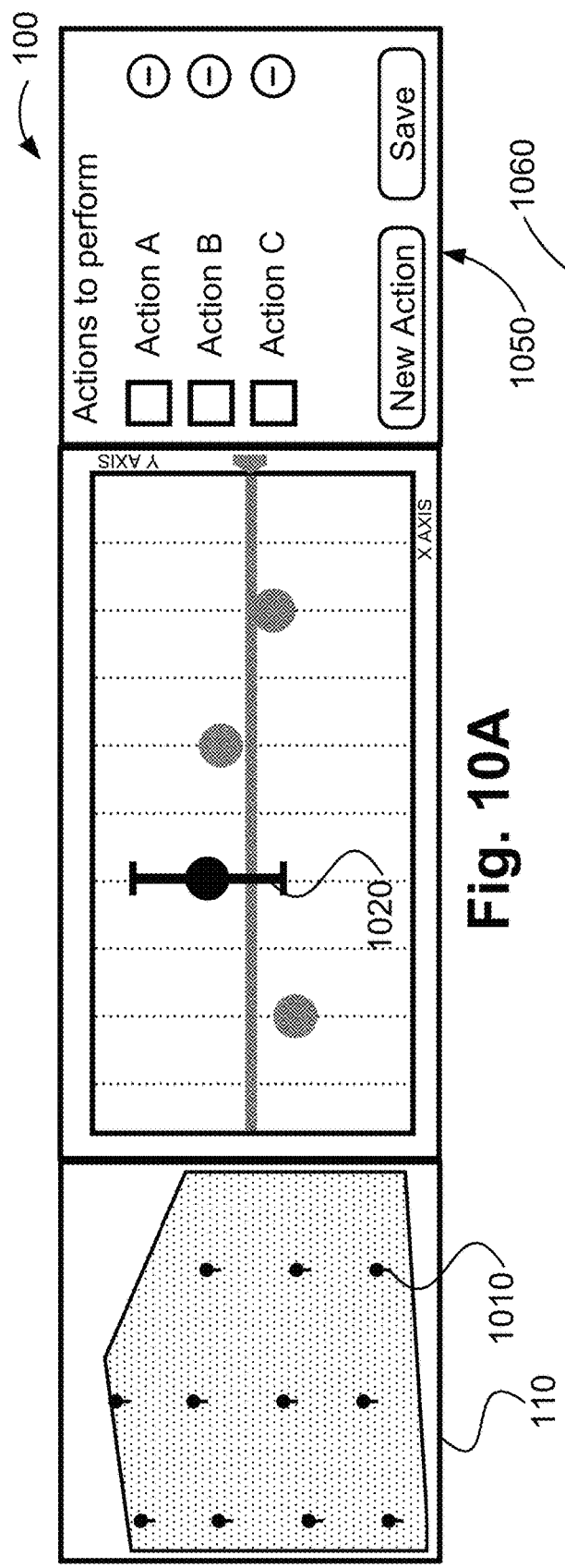
FIG. 10A shows a user interface showing a map, a health-plot and a list of predetermined actions, where one survey marker is selected.

FIG. 10A shows an example where a marker 1020 displayed on the user interface 100 has been wholly selected and an identified subset of images according to step 1520. The identified subset of images is displayed on the map 110 as location pins (e.g., one such pin is the pin 1010) according to step 1530. The locations for each image in the subset of images identified at step 1520 are retrieved from the same image database 1892 as the images themselves were retrieved.

At displaying step 1530, the location of each image in the subset of images identified at step 1520 are displayed on the map 110 under execution of the processor 1805. The map 110 shows a line-art map, a satellite or a terrain map of the blocks selected by the block selector 170. An example of such a location is displayed in the example of FIG. 10A as pin 1010. By displaying the locations of the subset of images on the map 110 the user is able to understand the area that the subset of images cover for the particular survey. An icon used to represent each pin may be one which identifies the grouped crop data category to which the crop data belongs, such as yield estimation being represented by a small grape icon; or a disease level being represented by a small biohazard icon. Alternatively, the icon may be a shade of a colour to identify from which survey the crop data corresponding to the icon originated. In one arrangement, an icon or shape that is coloured may be used to represent the distance between the crop data of an image and the mean of the survey corresponding to the image. As an example, a green dot may be used to represent the mean; a yellow dot matching the value of the lower marker-arm and a red dot matching the value of the upper marker-arm may be used, with a transition of colours in between the dots being displayed.

Figure 10B:
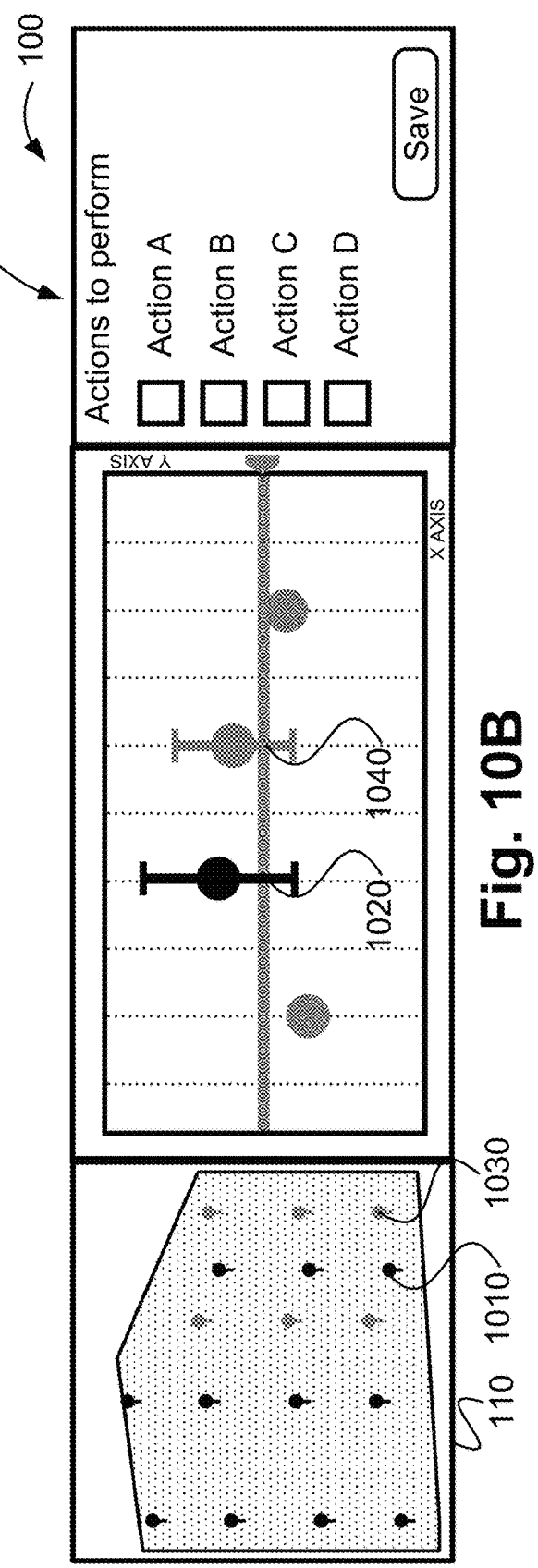
FIG. 10B shows a user interface showing a map, a health-plot and a list of predetermined actions, where two survey markers are selected.

In an example where two markers are selected, such as in FIG. 10B where both marker 1020 and marker 1040 are selected, then the map 110 displays the location pins for both the markers 1020 and 1040. For example, pin 1010 belonging to the survey of the marker 1020 and pin 1030 belonging to the survey of the marker 1040 are displayed in the map 110. Pins belonging to a different survey/marker of a health-plot may or may not be displayed in a distinguishable manner by either colouring the pins the same, or differently. Other methods of differentiating the pins other than colour are possible such as shape, animation and texture, for example.

In displaying step 1540, relevant actions for the selected markers are retrieved from the action database 1894. Each marker has one or more actions associated with the marker. The associated actions are stored in the actions database 1894 through the actions area 160 which will be described below with reference to FIG. 9. The associated actions are shown as part of the user interface 100 in the action area 1060 and action area 1050, as seen in FIGS. 10B and 10A, respectively. The actions correspond to actions a user needs to perform in response to the results of the marker. For example, if a marker-centre value is a mean that is above the target line then the actions displayed in the actions area (e.g., 1050) are actions necessary to help bring down the mean in a future marker.

As another example, a yield estimation survey may yield a result where there is forecast more yield than the target. Actions to present to the user for such an example may be encoded in the actions database 1894 to present to the user in such an example. The actions presented to the user may include, for example, "fruit thinning" (i.e., the process of removing some fruit prior to harvest), or "pruning" (i.e., the process of removing parts of the plant to reduce the yield).

The action area 1050 shows the actions available for the marker 1020 and the action area 1060 shows one more actions brought upon by marker 1040 being selected in addition to the previously selected marker 1020. In one arrangement, the actions are dependent on the markers that are selected in the health-plot and the selection of a marker-arm acts like a selection of the whole marker for the purpose of determining the actions. However, in an alternative arrangement, a selection of a marker-arm may present those actions that are relevant to the marker-arm. For example, marker 1020 has the lower marker-arm ending below the target and the upper marker-arm ending above the target and the marker-centre being above the target. A selection of the whole marker 1020 or the marker-centre or the upper marker-arm may result in actions that if performed may reduce yield (e.g., fruit thinning) However, selecting the lower marker-arm may present an action to irrigate more, for example, which may result in a greater yield for the crop at the locations indicated by the images whose crop data indicates that the marker is below the mean. The action area 1060 will now be described in more detail with reference to FIG. 9.

Figure 9:
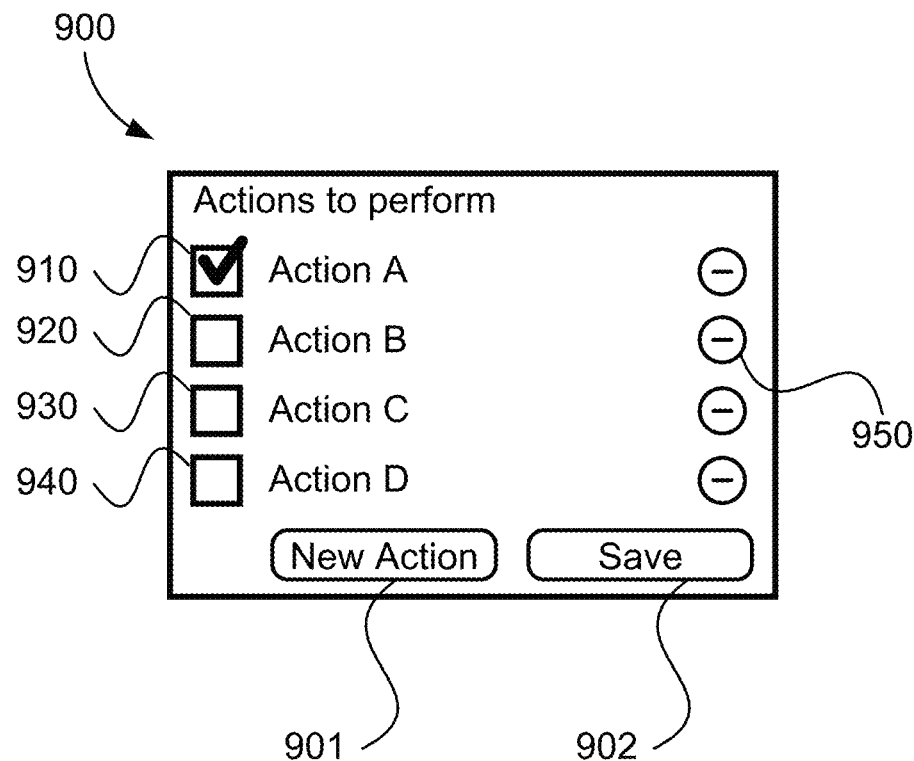
FIG. 9 shows a user interface displaying a list of predetermined actions.

FIG. 9 show an area 900 which is displayed in the actions area 160 of the interface 100. In the example of FIG. 9, the area 900 is shown with four actions, action A 910, action B 920, action C 930 and action D 940. Each action is shown in the area 900 with a checkbox, which can be either checked (such as action 910), or unchecked and a delete button (such as button 950) to remove. Additionally, the area 900 comprises a new action button 901 that may be used to add a new action to the list, and a save button 902 that may be used to save actions and the state of the actions (i.e., whether checked or unchecked). The actions are displayed in the actions area 160 in response to a marker in a health-plot being selected to indicate that the displayed actions are recommended to be carried out for the selected marker. The checkboxes (e.g.: 910) are an indication whether an action has been carried out. The delete button 950 may be selected to disassociate the suggested action from the selected marker. The new action button 901 may be selected to manually associate a new action to the selected marker. The save button 902 only appears in the area 900 once a change has been registered, whether the change be an action delete, completed, or uncompleted, or added. Selection of the save button 902 will result in the actions for the selected marker being updated. However, in the event that more than one marker is selected, or more than one portion of a marker is selected (e.g., the marker-arms or marker-centre) then the delete button 950 and new action button 901 are disabled as it becomes difficult to determine which action belong to which marker.

Initially, the actions database 1894 is populated with manually created entries that map between a) values of a grouped category of crop data; and b) whether or not a value is above or below a target line against a list of actions that may be performed. Each time a new survey is performed and markers in a health-plot are first displayed and selected, a new marker is registered in the actions database 1894 against a copy of the actions at the time. Then, if the copy of the actions is modified by addition or deletion the source of the mapping is updated to keep track of the actions that a user may want to be presented when an appropriate marker is shown.

Figure 11:
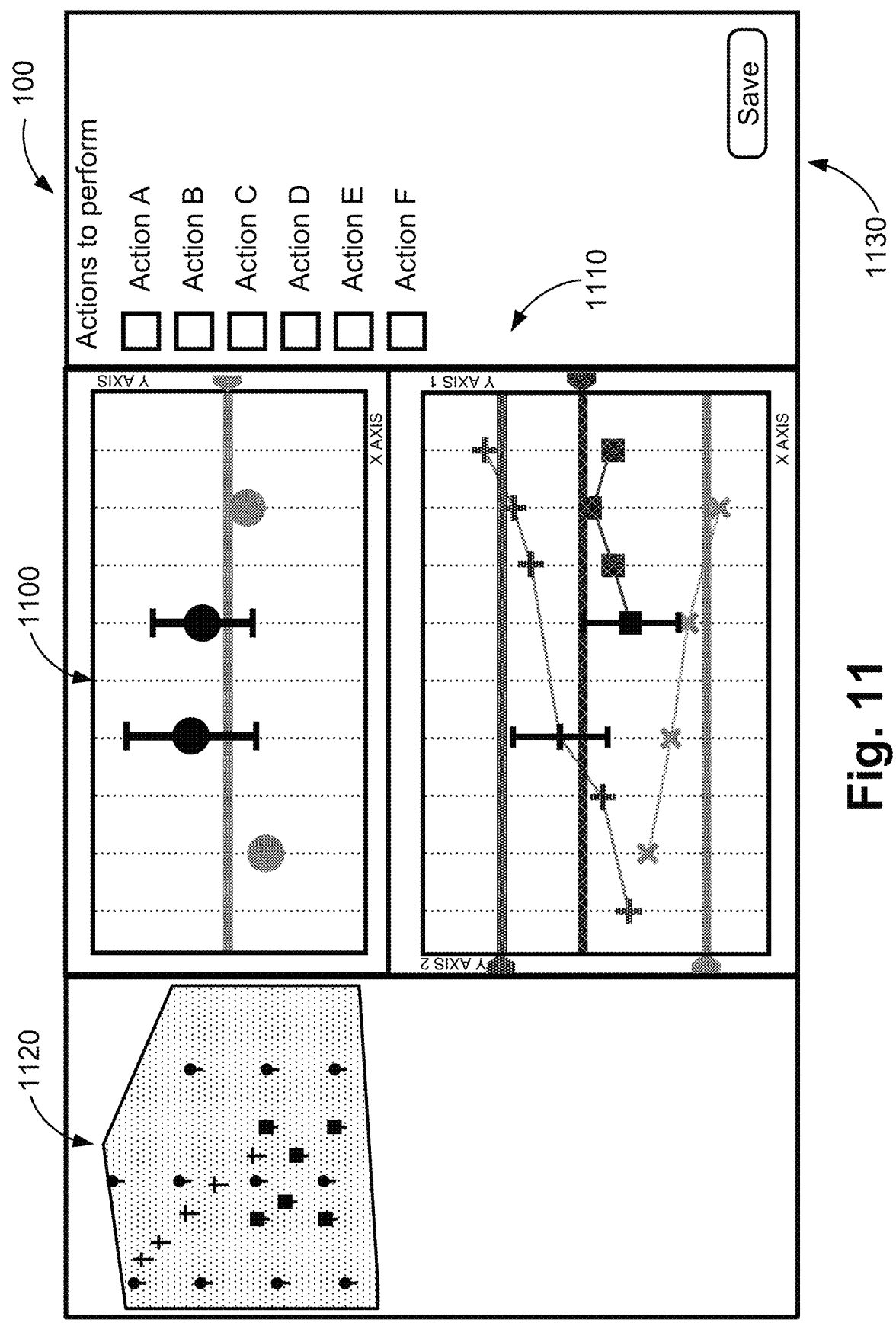
FIG. 11 shows a user interface displaying a map, two health-plots and a list of predetermined actions, where there are four survey markers selected.

FIG. 11 shows an example where there are two health-plot displayed on the interface 100. As seen in FIG. 11, health-plot 1100 comprises one series and two markers selected, and health-plot 1110 comprises three series and two markers selected. As an example, the health-plot 1100 may be a yield health-plot and the health-plot 1110 may represent a maturity health-plot with each series being either a Brix, or Ta or Ph type of crop data. Consequently, as described above, the action area 1130 is configured to show the cumulative actions for all the selected markers, without the deletion and addition options since there is more than one marker selected. As an example, the actions shown in the action area 1130 may comprise harvesting, spraying, pruning, or disease treatment, although other options are possible. Map 1120 consequently shows the locations of the subset of images of the four selected markers. Pins on the map 1120 are displayed in a manner that may identify which series the pins relate to, as is illustrated with the square, circle and cross pin shapes matching the circle, cross and square marker-centres in the health-plot 1100 and 1110. Other methods may also be used to identify which pin belongs to which series including, for example, the shape, the colour, the tone, the texture or an animation.

Figure 13A:
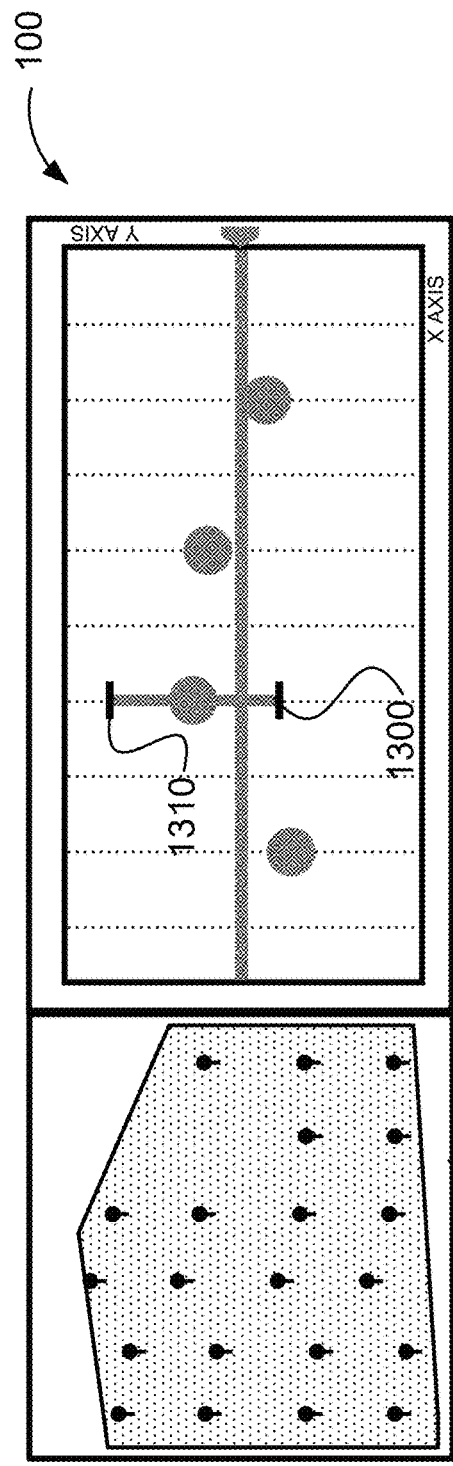
FIG. 13A shows a map and a health-plot with a pair of survey upper and lower marker-arms selected in preparation for the marker-arms to be moved by a user.

A method 1600 of displaying additional sample locations in the user interface 100 will now be described with reference to FIG. 16. The method 1600 will be described by way of example with reference to FIGS. 13A and 13B. The method 1600 may be implemented as one or more software code modules of the software application program 1833 resident in the ROM 1860 and being controlled in execution by the processor 1805.

Figure 13B:
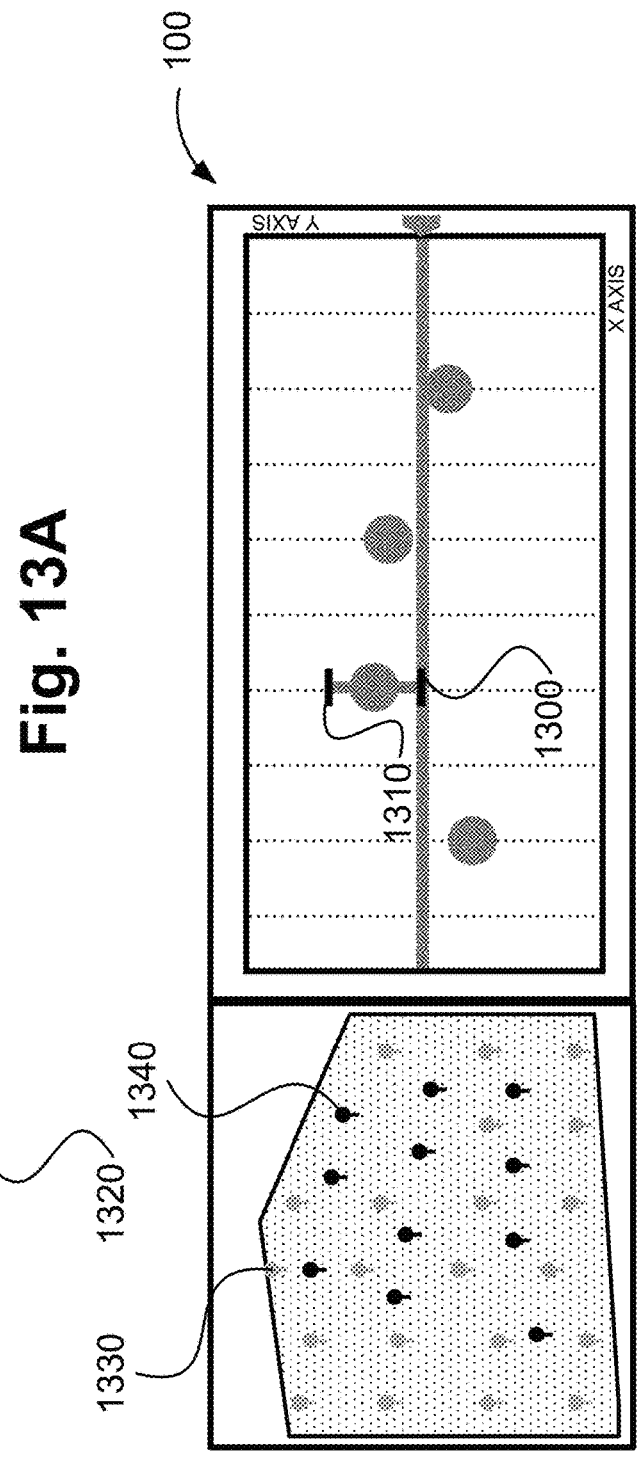
FIG. 13B shows the result of the user moving selected survey upper and lower marker-arms in the health-plot of FIG. 13A.

The method 1600 allows ends of the upper and lower marker-arms to be modified. Ends of the upper 1310 and lower 1300 marker-arms, will be referred to below as whiskers. The method 1600 allows the selection of a whisker such as whisker 1300 and whisker 1310 at the same time. The method 1600 does not allow the selection of one whisker independently of another. For example, selecting whisker 1300 will result in the whisker 1310 and the marker between the whiskers 1300 and 1310 to be automatically selected. The map 1320 displays the subset of images related to the selected marker to which the whiskers belong. Once the whiskers 1300 and 1310 have been selected the whiskers 1300 and 1310 may be moved away from the marker-centre or towards the marker-centre. FIG. 13B shows the whiskers 1310 and 1300 after the whiskers 1300 and 1310 have been moved closer together. The whiskers may be rendered as a perpendicular line to the line joining to the marker-arms to the marker-centre or dot or another shape. The whiskers may be any suitable shape.

As described above, the upper and lower marker-arms, and correspondingly the whiskers at the end, may represent a factor of the standard error of the crop data represented by the marker, or other types of variation. Consequently, in one arrangement, the whiskers will be allowed to be moved closer together at the same time (e.g., towards the marker-centre). The whiskers will also be allowed to be moved further away from each other but not beyond an original position before any adjustment commenced. In one arrangement, the whiskers may be allowed to be moved beyond an original position if the upper and lower marker-arm have been set as a result of a manual entry by a vineyard staff member rather than a statistically based approach requiring multiple sample locations and values. The method 1600 is executed, under execution of the processor 1805, once the whisker adjustment has been committed (e.g., after a user releases the whiskers to complete a drag gesture on the display 1814).

The method 1600 begins at receiving step 1610, where a whisker adjustment is received under execution of the processor 1805. The method 1600 then continues at identifying step 1620, where additional sampling locations are identified to attempt to achieve a new standard error required by the modified whiskers.

Identifying additional sample locations at step 1620 first requires determining how many additional locations are needed to achieve a reduction of the standard error by an amount indicated by the movement of the whiskers. Once the number of additional locations are determined, the locations to be sampled need to be determined. Once the number of additional locations and actual locations are determined, the additional locations may be displayed as pins 1340 on the map at displaying step 1630. The additional pins 1340 on the map are displayed in a manner that distinguishes the pins 1340 from the already sampled pins 1330 by being of a different colour, tone, brightness, shape or animation.

The number of additional locations may be determined at step 1620 by firstly determining the length of the upper or lower marker-arm from the associated marker-centre as 100%. The percentage reduction once the whisker adjustment is done is then determined and applied in accordance with Equation (1), as follows:

$$\text{Additional number of sampling points} = \text{CEIL}\left(\left(\frac{100}{P}\right)^2 \times N - N\right) \quad (1)$$

where N is the initial number of sampling points and P is the new percentage of the reduced marker-arm length. For example, an initial upper or lower marker-arm length of 100% may be reduced to 90% as a result of a whisker adjustment; and the initial number of sampling points may be thirty-five (35). The above Equation (1) results in:

$$\text{Additional number of sampling points} = \text{CEIL}\left(\left(\frac{100}{90}\right)^2 \times 35 - 35\right)$$

The additional number of sampling points becomes: nine (9).

Placing the additional locations at step 1620 may be performed by evenly distributing the new sample locations throughout the area of the block where the additional locations lie. The new sample locations may be distributed by dividing the area of the block by the number of the new sample locations required to produce a grid-like structure. The centre location of each grid is then taken as the location of the new sample location required.

In other arrangements, instead of only displaying the locations of the additional sample locations new locations may be displayed for all of the sampling points. In such an arrangement, instead of only sampling an additional nine (9) locations in accordance with the example described above the user would have to sample forty-four (44) locations again.

In another arrangement, instead of displaying the locations of samples for each selected marker, or section thereof, together on a map, the locations of samples may instead be intersected and only the locations which are common, displayed. For example, FIG. 12A shows a map 1200 and FIG. 12B shows a map 1210. Each of the maps 1200 and 1210 contains markers 1201 and 1211, respectively, which belong to a different marker on the same series of a health-plot. Alternatively, each of the maps 1200 and 1210 may contain markers 1201 and 1211 which belong to a different marker on a different series of the same health-plot, or of two different health-plots. Map 1200 of FIG. 12A shows each location of the images with a circle of influence. The category of crop data stored in the crop data category preferences database 1893 contains a configuration parameter that specifies that the radius of the circle of influence is for each location. The configuration parameter may be varied by the user when configuring the category of crop data. Examples of the circle of influence are shown at circle 1202 and circle 1212 as surrounding the pin 1201 and pin 1211, respectively. Circles of influence are also shown for the other pins on map 1200 and map 1210.

Map 1220 of FIG. 12C shows the only circle of influence from the circles on map 1200 intersected with only the circle of influence from the circles on map 1210. In one arrangement, a union operation may be performed on the circle of influences for the pins for each selected marker, or part thereof on the health-plot. The result of such a union may then be intersected. The result of the intersection is shown by the black circles 1221 on map 1220. The map 1220 also shows the circles that were not intersecting as the grey circles 1222 in the map 1220. Map 1230 of FIG. 12D shows the pins which correspond to the black circles 1221. The pins 1231 from map 1200 and pin 1232 from map 1210 are the resulting pins of the intersections of the pins shown on map 1200 and map 1210. Any suitable method of performing a union operation and intersecting shapes may be used to display the locations of samples as described above with reference to FIGS. 12A to 12D. In another arrangement, pins which overlap another pin may be determined by comparing global positioning system (GPS) position with a radius according to the circle of influence.

Figure 17:
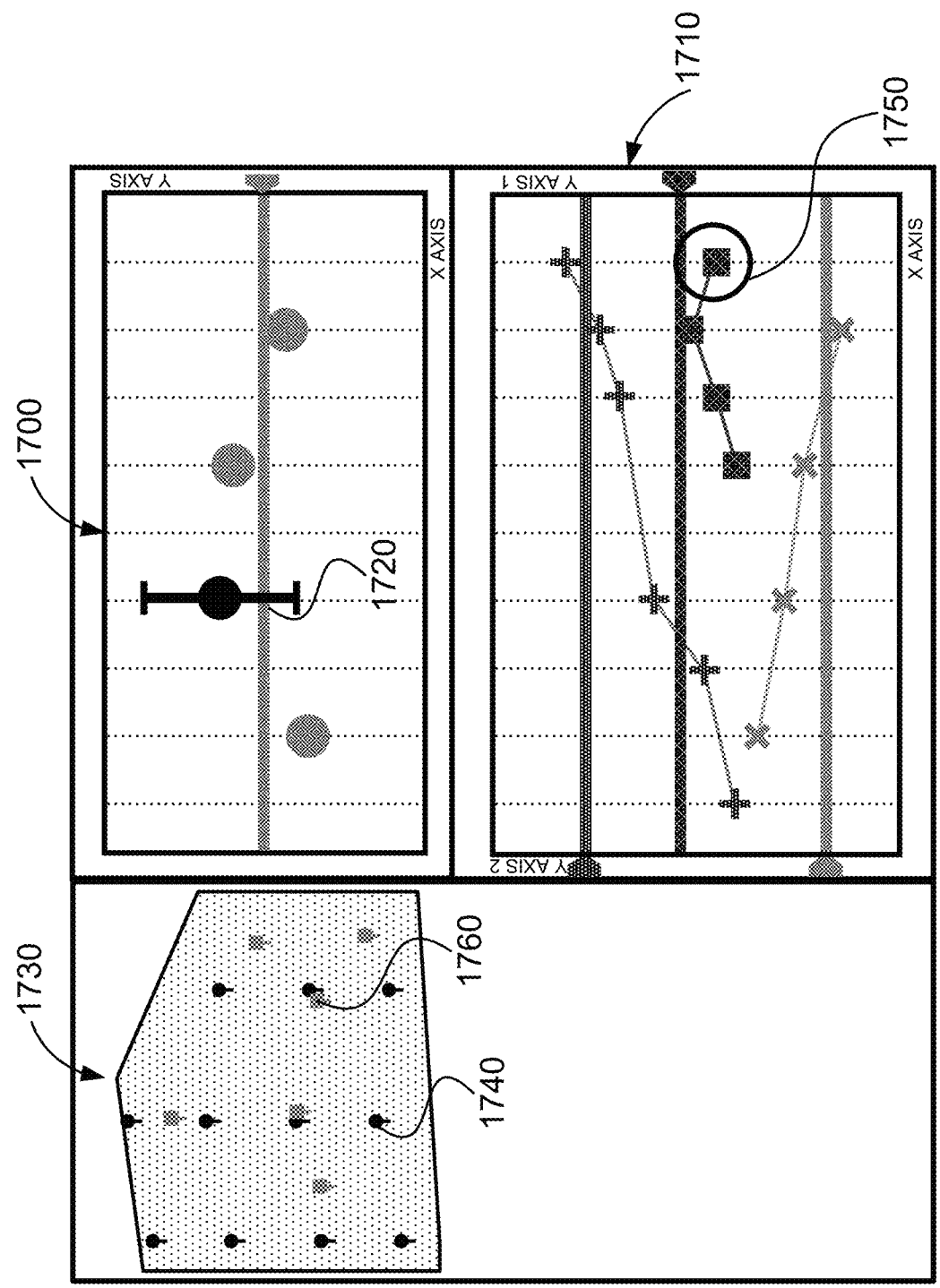
FIG. 17 shows two example health-plots.

In one arrangement, a marker on a health-plot to be selected may be recommended based on a prior selection of a marker on a health-plot, that may be a different health-plot, or the same health-plot, or another series within the same health-plot. In one arrangement, a selection position on one of a plurality of health-plots displays a corresponding portion on another of the plurality of health-plots associated with a displayed subset of sample site locations. For example, FIG. 17 shows a first health-plot 1700 and a second health-plot 1710. The first health-plot 1700 has a marker 1720 selected and pins corresponding to the marker 1700 on the map 1730 are shown as pin 1740. In the example of FIG. 17, a corresponding portion of the second health-plot 1710 is displayed by highlighting the corresponding portion to bring the portion to the attention of the user. In FIG. 17, a highlight 1750 is shown around one of the markers in the health-plot 1710. The highlight 1750 is shown as a circle to indicate which one or more markers, which may belong to separate series or the same, or across more than one health-plot, are the markers which are to be emphasised. The emphasis may be performed using any suitable method, including, for example, drawing shape around the marker, highlighting the marker by varying the colour, tone, animation, saturation and shape. Nevertheless, if the user during their usage of the health-plots has scrolled away or zoomed such that the marker to highlight is out of view, then the marker may be brought back into view and highlighted. Alternatively, the marker may be left out of view and unseen.

In one arrangement, the circle of influences previously described may be used to search for markers in another health-plot that contains overlapping pins. A marker whose survey occurred in the same or similar date may be searched either in a current or previous season so that a comparison may be made.

In one arrangement, a marker, either in the current growing season or a previous growing season, for which an action was recommended and performed (e.g., by ticking an action in the actions area) and whose effect on the current health-plot is the opposite of the actions currently recommended, may be searched. For example, a health-plot with a marker whose value is below the target may have recommended actions to increase the value, such as treatment for disease. In such an example, a marker may be sought that had a recommendation which could have caused the disease to occur (e.g., more irrigation). Allowing searches on a marker as described above enables a user to see the cause-and-effect that previous actions have on a current state of a crop.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

The invention claimed is:

1. A method of managing crops using an electronic device having an interface, the method comprising:
   receiving inputs of crop data, each of which being associated with a sample site location corresponding to each of a plurality of images captured by an image capturing device;
   generating a graph plotting one or more types of crop data including data associated with the plurality of images captured by the image capturing device in a first display region of the interface; and
   displaying a plurality of images which indicates a subset of sample site locations on a map in a second display region of the interface based on a selection within one of plots on the graph, the plurality of images which indicates the subset of sample site locations on the map being displayed when a user of the electronic device selects the one of plots on the graph.

2. The method according to claim 1, wherein the selection is selecting a point within a plot on the graph.

3. The method according to claim 1, wherein the crop data comprises values corresponding to at least one of a yield, maturity and disease of the image of a crop at a corresponding sample site location.

4. The method according to claim 1, wherein the plots on the graph comprise a yield plot and a maturity plot.

5. The method according to claim 1, wherein the plots on the graph further comprise a disease plot.

6. The method according to claim 1, further comprising displaying the subset of sample site locations requiring one of a predetermined set of actions in the second display region of the interface based on the selection.

7. The method according to claim 6, wherein the predetermined set of actions comprises one or more of harvesting, spraying, pruning, and disease treatment.

8. The method according to claim 6, wherein the predetermined set of actions corresponds to the crop health-plot.

9. The method according to claim 6, further comprising determining a variance range for a predetermined survey action based on variation in values corresponding to one type of crop data associated with the received plurality of sample sites in the block.

10. The method according to claim 6, further comprising displaying a modifiable variance icon in the graph in the first display region of the interface corresponding to a determined variance range.

11. The method according to claim 10, further comprising displaying one or more further sample site locations to be scored in a block on the map in the second display region based on an extent of modification to the displayed variance icon and a current target value of the predetermined survey action.

12. The method according to claim 10, wherein the variance is a statistical variance.

13. The method according to claim 1, wherein the generating includes generating a plurality of graphs each plotting one or more types of crop data in the first display region, and a selection of a plot on one of the plurality of graphs displays a corresponding portion on another of the plurality of graphs associated with a displayed subset of sample site locations.

14. The method according to claim 1, wherein the plurality of images which indicates the subset of sample site locations on the map is pins.

* * * * *